(12) United States Patent
Kim et al.

(10) Patent No.: US 10,488,951 B2
(45) Date of Patent: Nov. 26, 2019

(54) STYLUS PEN AND TOUCH PANEL CONFIGURED TO DETECT INPUT POSITION AND INPUT PRESSURE

(71) Applicant: SAMSUNG ELECTRONICS CO., LTD., Suwon-si (KR)

(72) Inventors: Kang-nam Kim, Seongnam-si (KR); Se-hyun Han, Namyangju-si (KR); Byung-jik Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 249 days.

(21) Appl. No.: 14/926,114

(22) Filed: Oct. 29, 2015

(65) Prior Publication Data

US 2016/0216784 A1 Jul. 28, 2016

(30) Foreign Application Priority Data

Jan. 27, 2015 (KR) ........................ 10-2015-0012895

(51) Int. Cl.
*G06F 3/0354* (2013.01)
*G06F 3/044* (2006.01)
*G06F 3/041* (2006.01)
*G06F 1/16* (2006.01)

(52) U.S. Cl.
CPC ............ *G06F 3/03545* (2013.01); *G06F 1/16* (2013.01); *G06F 3/044* (2013.01); *G06F 3/0416* (2013.01)

(58) Field of Classification Search
None
See application file for complete search history.

(56) References Cited

U.S. PATENT DOCUMENTS 4,786,764 A * 11/1988 Padula ................ G06F 3/03545
178/19.04
5,581,052 A * 12/1996 Padula ................ G06F 3/03545
178/19.04
(Continued)

FOREIGN PATENT DOCUMENTS

CN            1453741  A     11/2003
CN          101739157  A      6/2010
(Continued)

OTHER PUBLICATIONS

Communication dated Feb. 23, 2017, issued by the Taiwan Intellectual Property Office in counterpart Taiwanese Patent Application No. 104139047.

(Continued)

*Primary Examiner* — Chad M Dicke
(74) *Attorney, Agent, or Firm* — Sughrue Mion, PLLC

(57) ABSTRACT

A stylus pen and a touch panel are provided. The stylus pen includes: a conductive tip configured to receive an electric field transmission signal from at least one electrode of the touch panel; a circuit portion configured to generate an electric field receiving signal corresponding to the received electric field transmission signal; a variable capacitor between the conductive tip and the circuit portion, and configured to vary the electric field receiving signal depending on a writing pressure applied to the conductive tip; and a conductive body outside the variable capacitor and electrically connecting the conductive tip and the circuit portion.

16 Claims, 28 Drawing Sheets

(56) References Cited

U.S. PATENT DOCUMENTS

| | | | |
|---|---|---|---|
| 5,600,105 A * | 2/1997 | Fukuzaki | G06F 3/046 178/18.07 |
| 6,160,539 A * | 12/2000 | Fleck | G06F 3/0488 345/173 |
| 6,252,182 B1 * | 6/2001 | Lai | G06F 3/03545 178/19.04 |
| 7,623,120 B2 | 11/2009 | Liu et al. | |
| 7,778,795 B2 | 8/2010 | Fukushima et al. | |
| 8,184,109 B2 | 5/2012 | Fukushima et al. | |
| 8,508,510 B2 | 8/2013 | Kim | |
| 8,525,530 B2 | 9/2013 | Fukushima et al. | |
| 8,525,816 B2 | 9/2013 | Fukushima et al. | |
| 8,587,565 B2 | 11/2013 | Fukushima et al. | |
| 9,600,095 B2 * | 3/2017 | Horie | G06F 3/03 |
| 9,733,766 B2 | 8/2017 | Liu et al. | |
| 2001/0001430 A1 * | 5/2001 | Ely | G01D 5/2073 178/18.03 |
| 2002/0070927 A1 * | 6/2002 | Fujitsuka | G01D 5/2006 345/179 |
| 2003/0132923 A1 | 7/2003 | Hu | |
| 2005/0162411 A1 | 7/2005 | Berkel van | |
| 2006/0007164 A1 | 1/2006 | Liu et al. | |
| 2008/0180092 A1 * | 7/2008 | Fukushima | G01D 5/208 324/207.16 |
| 2008/0257613 A1 * | 10/2008 | Katsurahira | G06F 3/03545 178/19.04 |
| 2009/0076770 A1 * | 3/2009 | Fukushima | G06F 3/03545 702/150 |
| 2009/0114459 A1 * | 5/2009 | Fukushima | G06F 3/03545 178/19.03 |
| 2010/0117994 A1 | 5/2010 | Fukushima et al. | |
| 2011/0050651 A1 * | 3/2011 | Chen | G06F 3/03542 345/179 |
| 2011/0192658 A1 * | 8/2011 | Fukushima | G06F 3/03545 178/19.03 |
| 2011/0241703 A1 * | 10/2011 | Fukushima | G06F 3/03545 324/662 |
| 2012/0012450 A1 | 1/2012 | Liu et al. | |
| 2012/0013555 A1 | 1/2012 | Maeda et al. | |
| 2012/0026127 A1 | 2/2012 | Kim | |
| 2012/0194484 A1 | 8/2012 | Lehman | |
| 2013/0113754 A1 * | 5/2013 | Lee | G06F 3/03545 345/174 |
| 2013/0193532 A1 * | 8/2013 | Horie | H01L 29/84 257/415 |
| 2013/0199311 A1 * | 8/2013 | Horie | G01L 1/142 73/862.626 |
| 2013/0229364 A1 | 9/2013 | Yu et al. | |
| 2013/0241897 A1 | 9/2013 | Fukushima et al. | |
| 2013/0249870 A1 | 9/2013 | Slaby et al. | |
| 2013/0329335 A1 * | 12/2013 | Obata | G06F 3/046 361/278 |
| 2013/0330115 A1 | 12/2013 | Steele et al. | |
| 2014/0085270 A1 * | 3/2014 | Obata | G06F 3/03545 345/179 |
| 2014/0165742 A1 * | 6/2014 | Fergusson | G06F 3/03545 73/862.68 |
| 2014/0240298 A1 | 8/2014 | Stern | |
| 2014/0306909 A1 * | 10/2014 | Pedersen | G06F 3/03545 345/173 |
| 2014/0320445 A1 | 10/2014 | Kim | |
| 2014/0320450 A1 | 10/2014 | Lee et al. | |
| 2015/0022503 A1 | 1/2015 | Chang et al. | |
| 2015/0130772 A1 * | 5/2015 | Katsurahira | G06F 3/044 345/179 |
| 2015/0247743 A1 * | 9/2015 | Horie | G01L 1/142 324/207.17 |
| 2015/0317001 A1 * | 11/2015 | Ben-Bassat | G06F 3/03545 345/179 |
| 2016/0018912 A1 * | 1/2016 | Kaneda | G06F 3/033 345/179 |
| 2016/0154528 A1 * | 6/2016 | Ahn | G06F 3/038 345/174 |
| 2016/0187217 A1 * | 6/2016 | Horie | G01L 1/142 73/724 |
| 2016/0188016 A1 * | 6/2016 | Munakata | G06F 3/0416 345/179 |
| 2016/0188019 A1 * | 6/2016 | Obata | G06F 3/046 361/821 |
| 2016/0209957 A1 * | 7/2016 | Jung | G06F 3/044 |
| 2016/0306447 A1 * | 10/2016 | Fleck | G06F 3/03545 |
| 2016/0313812 A1 * | 10/2016 | Katsurahira | G06F 3/0383 |
| 2016/0378211 A1 * | 12/2016 | Kim | G06F 3/03545 345/173 |
| 2017/0102792 A1 * | 4/2017 | Aoki | G06F 3/0383 |

FOREIGN PATENT DOCUMENTS

| | | |
|---|---|---|
| CN | 101847065 B | 1/2013 |
| CN | 104142770 A | 11/2014 |
| CN | 104995586 A | 10/2015 |
| EP | 2 187 289 A1 | 5/2010 |
| EP | 2698690 A2 | 2/2014 |
| JP | 2005-288794 A | 10/2005 |
| JP | 2006-163652 A | 6/2006 |
| JP | 2013-234986 A | 11/2013 |
| KR | 10-2011-0131989 A | 12/2011 |
| WO | 2014/128712 A1 | 8/2014 |
| WO | 2015002440 A1 | 1/2015 |

OTHER PUBLICATIONS

Communication dated Mar. 3, 2017, issued by the European Patent Office in counterpart European Patent Application No. 15197733.7.
Communication dated Jul. 20, 2016, issued by the European Patent Office in counterpart European Application No. 15197733.7.
Communication (PCT/ISA/210) dated Apr. 22, 2016, issued by the International Searching Authority in counterpart International Application No. PCT/KR2015/011117.
Communication (PCT/ISA/237) dated Apr. 22, 2016, issued by the International Searching Authority in counterpart International Application No. PCT/KR2015/011117.
Communication dated Jun. 16, 2016, issued by the European Patent Office in counterpart European Application No. 15197733.7.
Communications dated Feb. 12, 2018, issued by the Chinese Patent Office in counterpart Chinese application No. 201610027999.8.
Communication dated Mar. 21, 2018, issued by the European Patent Office in counterpart European application No. 15 197 733.7.
Office Action dated Nov. 6, 2018 by the State Intellectual Property Office of P.R. China in counterpart Chinese Patent Application No. 201610027999.8.
Communication dated Mar. 6, 2019, issued by the Indian Patent Office in counterpart Indian Application No. 4270/DEL/2015.
Communication dated May 22, 2019, issued by the State Intellectual Property Office of P.R. China in counterpart Chinese Application No. 201610027999.8.

* cited by examiner

STYLUS PEN AND TOUCH PANEL CONFIGURED TO DETECT INPUT POSITION AND INPUT PRESSURE

CROSS-REFERENCE TO RELATED APPLICATION

This application claims priority from Korean Patent Application No. 10-2015-0012895, filed Jan. 27, 2015 in the Korean Intellectual Property Office, the disclosure of which is incorporated herein by reference in its entirety.

BACKGROUND

1. Field

Apparatuses and methods consistent with exemplary embodiments relate to a stylus pen and a touch panel, and more particularly, to a stylus pen and a touch panel that can connect a second electrode of a variable capacitor to a circuit portion without a separate connection member.

2. Description of the Related Art

Recently, smart phones and tablet computers have become increasingly popular, and technology for a contact position measurement device embedded therein has been actively developed. The smart phones and tablet computers are generally provided with a touch screen, and a user can designate a specific coordinate of the touch screen using, for example, a stylus pen. The user can input a specific signal to the smart phone by specifying a specific coordinate of the touch screen.

Furthermore, the touch screen can sense both a position of the stylus pen and a writing pressure at the corresponding position, thereby performing a variety of actions depending on the position and the writing pressure. In order to sense the writing pressure of the stylus pen, the stylus pen is provided with a variable capacitor, a capacitance of which varies according to the writing pressure of the stylus pen.

The variable capacitor may vary in capacitance according to the change in a distance between two electrodes or an area between the two electrodes. For example, the stylus pens may use a variable capacitor, the capacitance of which is varied by a change in the area between the two electrodes.

In the stylus pen employing such a variable capacitor, because the two electrodes of the capacitor are to be arranged in the vertical direction of the pen and a resonance circuit is arranged in the rear end of the pen, it is difficult to connect an electrode disposed close to the front end of the pen to the resonance circuit.

In order to provide the stylus pen with a minimal diameter, technology for connecting both electrodes of the variable capacitor to the resonance circuit without changing the diameter of the stylus pen is demanded.

SUMMARY

Aspects of one or more exemplary embodiments have been developed in order to overcome the above drawbacks and other problems associated with the related art arrangement. An aspect of an exemplary embodiment relates to a stylus pen and a touch panel that can connect a second electrode of a variable capacitor to a circuit portion without a separate connection member.

According to an aspect of an exemplary embodiment, there is provided a stylus pen for making an input to a position on a touch panel, the stylus pen including: a conductive tip configured to receive an electric field transmission signal from at least one electrode of the touch panel; a circuit portion configured to generate an electric field receiving signal corresponding to the received electric field transmission signal; a variable capacitor between the conductive tip and the circuit portion, and configured to vary the electric field receiving signal depending on a writing pressure applied to the conductive tip; and a conductive body outside the variable capacitor and electrically connecting the conductive tip and the circuit portion.

The variable capacitor may include: a dielectric including a first surface and a second surface positioned opposite to the first surface; a first electrode in contact with the first surface of the dielectric; and a conductive variable electrode configured such that a contact area between the conductive variable electrode and the second surface of the dielectric is varied depending on a pressure applied through the conductive tip.

The conductive variable electrode may be configured such that a central portion of a surface in contact with the second surface of the dielectric is convex from an edge portion of the surface.

The conductive variable electrode may be configured such that a central portion of a surface in contact with the second surface of the dielectric is concave from an edge portion of the surface.

The conductive variable electrode may include a conductive rubber.

The stylus pen may further include an elastic member in an inside of the conductive variable electrode.

The stylus pen may further include a ground portion electrically connected to a user through at least one of direct contact and capacitive coupling.

The stylus pen may further include a conductive case isolated from the conductive body and connected to the ground portion.

The stylus pen may further include an elastic member configured to restore a position of the conductive tip.

The stylus pen may further include a housing having a tubular shape and housing the variable capacitor, wherein the housing may be formed of a non-conductive material, and may include at least one opening on an outer circumferential surface of the housing and through which the conductive body passes.

The stylus pen may further include an insulator on an outer circumferential surface of the conductive tip, to isolate the conductive tip from the elastic member and the variable capacitor.

The insulator may include a first cap and a second cap; and the first cap may be on an end of the housing and support a first end of the elastic member, and the second cap may be on the outer circumferential surface of the conductive tip and support a second end of the elastic member.

The insulator may include a guide member on the outer circumferential surface of the conductive tip and configured to guide the conductive tip in a lengthwise direction of the housing.

The guide member may support a first end of the elastic member and a projection on an inner circumferential surface of the housing may support a second end of the elastic member.

The elastic member may include a non-conductive material.

The stylus pen may further include a conductive support member including a first receiving hole in a first end of the conductive support member and a second receiving hole in a second end, opposite the first end, of the conductive support member, wherein the first receiving hole may be coupled with the conductive variable electrode, and wherein the second receiving hole may be coupled with an end portion of the conductive tip.

The stylus pen may further include an insulator on an outer circumferential surface of the conductive support member to isolate the conductive support member from the elastic member.

The conductive body may include a plurality of plates and a circular member connected to an end of each of the plurality of plates; the plurality of plates may be spaced apart from each other and disposed side-by-side; and the circular member may include an opening through which the conductive tip passes.

The circuit portion may include: a capacitor having a predetermined capacitance; and a switch configured to allow the capacitor to be selectively connected in parallel to the variable capacitor.

A first end of the variable capacitor may be directly connected to an end of the circuit portion, and a second end of the variable capacitor may be connected to the circuit portion through the conductive body.

According to an aspect of another exemplary embodiment, there is provided a stylus pen including: a conductive tip projecting from an end of the stylus pen; a dielectric including a first surface and a second surface positioned opposite to the first surface; a first electrode in contact with the first surface of the dielectric; a conductive variable electrode configured such that a contact area between the conductive variable electrode and the second surface of the dielectric is varied depending on a pressure applied through the conductive tip; and a conductive body outside the dielectric, electrically connecting the conductive tip and the conductive variable electrode, and isolated from the dielectric and the first electrode.

The stylus pen may further include an elastic member isolated from the conductive tip and configured to restore a position of the conductive tip.

The stylus pen may further include a housing formed of a non-conductive material, and including at least one opening on an outer circumferential surface of the housing through which the conductive body passes.

The stylus pen may further include an insulator on an outer circumferential surface of the conductive tip, to isolate the conductive tip from the elastic member.

The insulator may include a first cap and a second cap; and the first cap may be on an end of the housing and support a first end of the elastic member, and the second cap may be on the outer circumferential surface of the conductive tip and support a second end of the elastic member.

The insulator may include a guide member on the outer circumferential surface of the conductive tip and configured to guide the conductive tip in a lengthwise direction of the housing.

The guide member may support a first end of the elastic member and a projection on an inner circumferential surface of the housing may support a second end of the elastic member.

According to an aspect of another exemplary embodiment, there is provided a touch panel for determining an input position of an input object, the touch panel including: at least one electrode; and a controller configured to control an electric field transmission signal generated in the at least one electrode to be transmitted to the input object, and to control to receive, from the input object via the at least one electrode, an electric field receiving signal corresponding to the electric field transmission signal.

The controller may be configured to determine the input position of the input object based on the at least one electrode that receives the electric field receiving signal.

The controller may be configured to determine the input position and a pressure of the input object to the touch panel, based on the received electric field receiving signal.

The touch panel may further include: a driver configured to control the electric field transmission signal to be transmitted from the at least one electrode, according to a control of the controller; and a receiver configured to receive the electric field receiving signal via the at least one electrode, wherein the controller may be configured to control the driver and the receiver to alternately operate.

According to an aspect of another exemplary embodiment, there is provided an input object for making an input to a position on a touch panel, the input object including: a conductive tip configured to receive an electric field transmission signal from at least one electrode of the touch panel; a circuit portion configured to generate an electric field receiving signal corresponding to the received electric field transmission signal such that the electric field receiving signal is varied depending on a pressure applied to the conductive tip; and a conductive body electrically connecting the conductive tip and the circuit portion.

The input object may further include a variable capacitor between the conductive tip and the circuit portion, and configured to vary the electric field receiving signal depending on the pressure applied to the conductive tip.

The circuit portion may include: a capacitor having a predetermined capacitance; and a switch configured to allow the capacitor to be selectively connected in parallel to the variable capacitor.

A first end of the variable capacitor may be directly connected to an end of the circuit portion, and a second end of the variable capacitor may be connected to the circuit portion through the conductive body.

The input object may further include an elastic member configured to restore a position of the conductive tip.

The input object may further include a housing formed of a non-conductive material, and including at least one opening on an outer circumferential surface of the housing through which the conductive body passes.

The input object may further include an insulator on an outer circumferential surface of the conductive tip, to isolate the conductive tip from the elastic member.

The insulator may include a first cap and a second cap; and the first cap may be on an end of the housing and support a first end of the elastic member, and the second cap may be on the outer circumferential surface of the conductive tip and support a second end of the elastic member.

The insulator may include a guide member on the outer circumferential surface of the conductive tip and configured to guide the conductive tip in a lengthwise direction of the housing.

The guide member may support a first end of the elastic member and a projection on an inner circumferential surface of the housing may support a second end of the elastic member.

Other objects, advantages and salient features of the present disclosure will become apparent from the following detailed description, which, taken in conjunction with the annexed drawings, discloses exemplary embodiments.

BRIEF DESCRIPTION OF THE DRAWINGS

These and/or other aspects and advantages will become apparent and more readily appreciated from the following description of exemplary embodiments, taken in conjunction with the accompanying drawings of which.

DETAILED DESCRIPTION OF THE EXEMPLARY EMBODIMENTS

Figure 1:
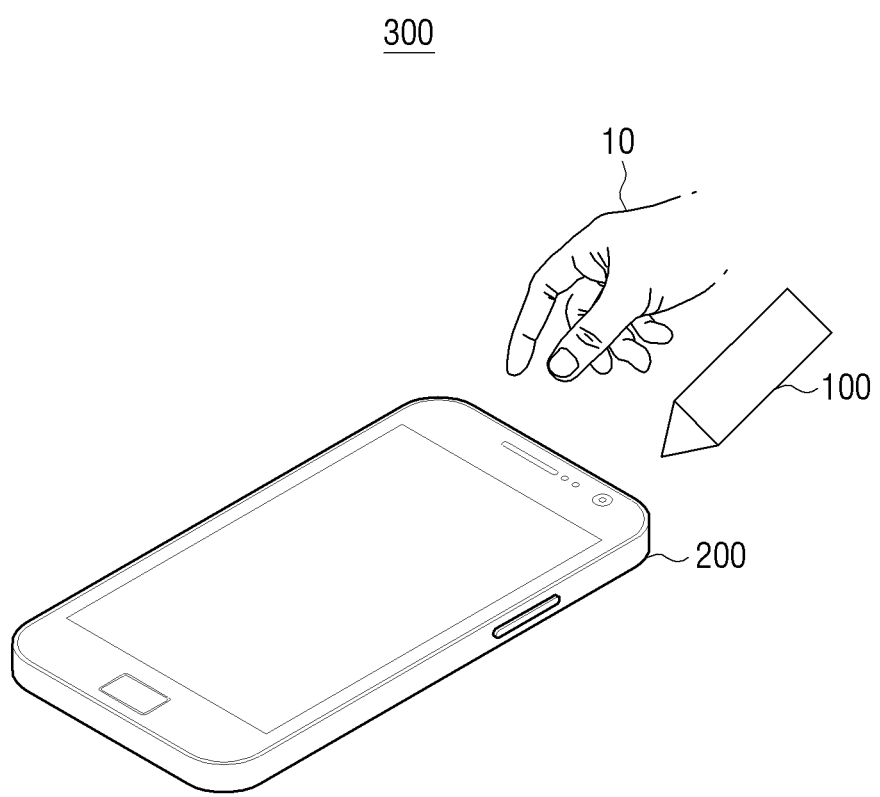
FIG. 1 is a block diagram illustrating a configuration of a coordinate measuring system according to an exemplary embodiment.

Hereinafter, certain exemplary embodiments will be described in detail with reference to the accompanying drawings, in which like reference numerals will be understood to refer to like parts, components and structures throughout.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding. Hereinafter, it is understood that expressions such as "at least one of," when preceding a list of elements, modify the entire list of elements and do not modify the individual elements of the list.

FIG. 1 is a block diagram illustrating a configuration of a coordinate measuring system 300 according to an exemplary embodiment.

Referring to FIG. 1, a coordinate measuring system 300 includes a touch panel 200 and an input object. While one or more exemplary embodiments are disclosed with reference to a stylus pen 100 as the input object, it is understood that one or more other exemplary embodiments are not limited thereto.

The touch panel 200 determines a position of the stylus pen 100. Specifically, the touch panel 200 includes a plurality of electrodes, and can transmit an electric field transmission signal (e.g., a drive signal) to a resonance circuit of an object (e.g., the stylus pen) approaching the touch panel 200 through a capacitance coupling by applying the electric field transmission signal to at least one electrode among the plurality of electrodes.

The touch panel 200 may determine the position of the stylus pen 100 by receiving a response signal (e.g., an electric field receiving signal), which is generated in the resonance circuit of the stylus pen 100, via at least one electrode among the plurality of electrodes. A specific configuration and operation of the touch panel 200 according to an exemplary embodiment will be described below with reference to FIG. 27. Here, the touch panel 200 may include a tablet computer, a digitizer, a touch pad, a touch screen. Additionally, the touch panel 200 may be implemented in a notebook computer, a mobile phone, a smart phone, a portable multimedia player (PMP), an MP3 player, an electronic blackboard, and the like.

The stylus pen 100 forms a capacitance with at least one electrode of the plurality of electrodes in the touch panel 200, and may receive energy for resonance (e.g., the electric field transmission signal) through the formed capacitance.

The stylus pen 100 may transmit a response signal (e.g., the electric field receiving signal) generated by the resonance circuit to the at least one electrode in the touch panel 200. The stylus pen 100 may be implemented in a form of a pen, but is not limited thereto. A specific configuration and operation of the stylus pen 100 according to one or more exemplary embodiments will be described below with reference to FIGS. 2 to 26.

Because the coordinate measuring system 300 according to an exemplary embodiment is configured such that the touch panel 200 provides the electric field transmission signal to the stylus pen 100 through the capacitance coupling, the stylus pen 100 can operate without its own power supply or without using its own power supply when the capacitance coupling exists.

That is, while in the above-described exemplary embodiment, the stylus pen 100 is described as operating in a passive manner, it is understood that one or more other exemplary embodiments are not limited thereto. For example, the stylus pen 100 according to another exemplary embodiment may also operate in an active manner with its own power supply.

Furthermore, in the above-described exemplary embodiment, the touch panel 200 is described as determining the position of the stylus pen 100 including the resonance circuit. However, it is understood that one or more other exemplary embodiments are not limited to the stylus pen 100. For example, according to another exemplary embodiment, the touch panel 200 may determine a position of a finger 10 by detecting a change in capacitance of the electrode, among the plurality of electrodes, according to the position of the finger 10 or a change in a signal level generated due to the change in the capacitance.

Moreover, in the above-described exemplary embodiment, it is described that a single stylus pen 100 is connected to the touch panel. However, it is understood that one or more other exemplary embodiments are not limited thereto. For example, according to another exemplary embodiment, a plurality of stylus pens 100 may be connected to a single touch panel 200. In this case, the touch panel 200 can detect a position of each of the plurality of stylus pens 100.

Figure 2:
FIG. 2 is a block diagram illustrating a configuration of a stylus pen of FIG. 1, according to an exemplary embodiment.

FIG. 2 is a view illustrating a configuration of the stylus pen 100 of FIG. 1, according to an exemplary embodiment.

Referring to FIG. 2, the stylus pen 100 may include a conductive tip 110, a resonance circuit portion 120, and a ground part 130. The stylus pen 100 may be implemented in a shape of a pen.

The conductive tip 110 forms capacitance with at least one electrode of the plurality of electrodes in the touch panel 200. The conductive tip 110 may be formed of a metal tip, for example. The conductive tip 110 may be provided inside a non-conductive material or a portion of the conductive tip 110 may be exposed to the outside. Also, in order for a smooth writing feeling in use, an insulation portion that prevents the conductive tip 110 from being in direct contact with the outside may further be included.

The resonance circuit portion 120 (or a circuit portion) may include a variable capacitor and a parallel resonance circuit including a capacitor and an inductor connected to the conductive tip 110.

The resonance circuit portion 120 may receive energy for resonance (e.g., the electric field transmission signal) through a capacitive coupling between the at least one electrode in the touch panel 200 and the conductive tip 110. In detail, the resonance circuit portion 120 may resonate with the electric field transmission signal to be input from the touch panel 200. The resonance circuit portion 120 may output an electric field receiving signal by the resonance even after the input of the electric field transmission signal has stopped. For example, the resonance circuit portion 120 may output a sine wave signal having a resonance frequency of the resonance circuit portion 120.

In the resonance circuit portion 120, the resonance frequency may be varied by the change in the capacitance of the variable capacitor depending on the contact pressure of the conductive tip 110. This operation will be described below with reference to FIG. 3.

Also, in the resonance circuit portion 120, the capacitance of the capacitor or the inductance of the inductor varies depending on a user's manipulation so that the resonance frequency may be varied. This operation will be described below with reference to FIG. 24.

Figure 3:
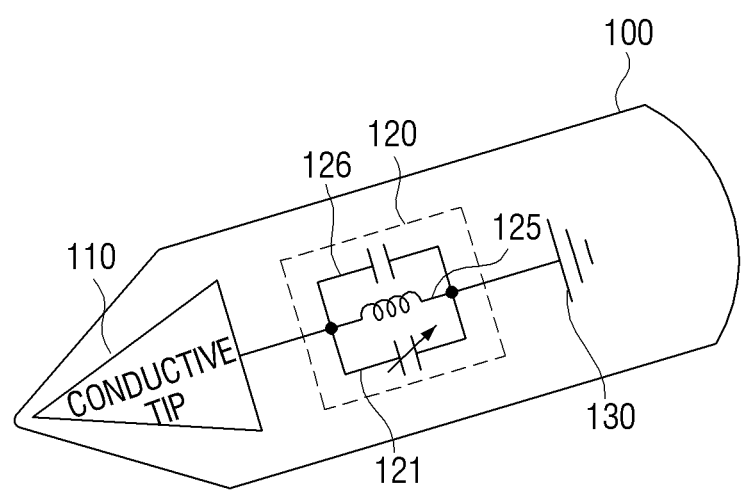
FIG. 3 is a view illustrating a circuit diagram of a stylus pen according to a first exemplary embodiment.

FIG. 3 is a view illustrating a circuit diagram of the stylus pen 100 of FIG. 1.

Referring to FIG. 3, the resonance circuit portion 120 may include an inductor 125, a capacitor 126, and a variable capacitor 121. One end of the resonance circuit portion 120 is connected to the conductive tip 110, and the other end thereof may be grounded.

The inductor 125 and the capacitor 126 are connected in parallel, and operate as a resonance circuit. The resonance circuit may have a high-impedance characteristics at a specific resonance frequency.

The variable capacitor 121 is connected in parallel with the resonance circuit, and the capacitance thereof may be varied depending on the change in the contact pressure of the conductive tip 110. Accordingly, when the capacitance of the variable capacitor 121 is changed, the capacitance of the whole resonance circuit is also varied so that the resonance frequency of the resonance circuit may be varied. In other words, the variable capacitor 121 may vary the electric field receiving signal in accordance with a writing pressure being applied to the conductive tip 110. A specific shape and operation of the variable capacitor 121 according to one or more exemplary embodiments will be described below with reference to FIGS. 6 to 12.

Because the response signal provided to the touch panel 200 according to a first exemplary embodiment is varied depending on the contact pressure with the touch panel 200, the touch panel 200 may detect not only a position of the stylus pen 100, but also a writing pressure of the stylus pen 100 on the basis of the response signal of the stylus pen 100.

In the above-described exemplary embodiment, the resonance frequency is varied by using the variable capacitor 121. However, it is understood that one or more other exemplary embodiments are not limited thereto. For example, according to another exemplary embodiment, a resonance circuit portion 120 that performs the same function by using a variable inductor, an inductance of which can be varied depending on the contact pressure of the conductive tip 110, may be implemented.

Figure 4:
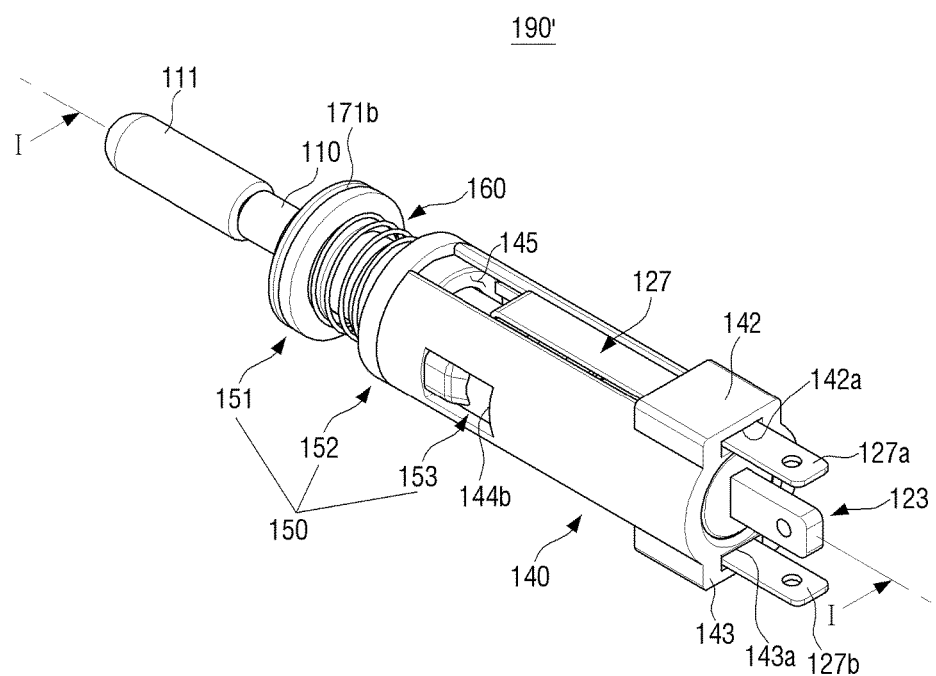
FIG. 4 is a perspective view illustrating a writing pressure module of the stylus pen of FIG. 3, according to an exemplary embodiment.
Figure 5:
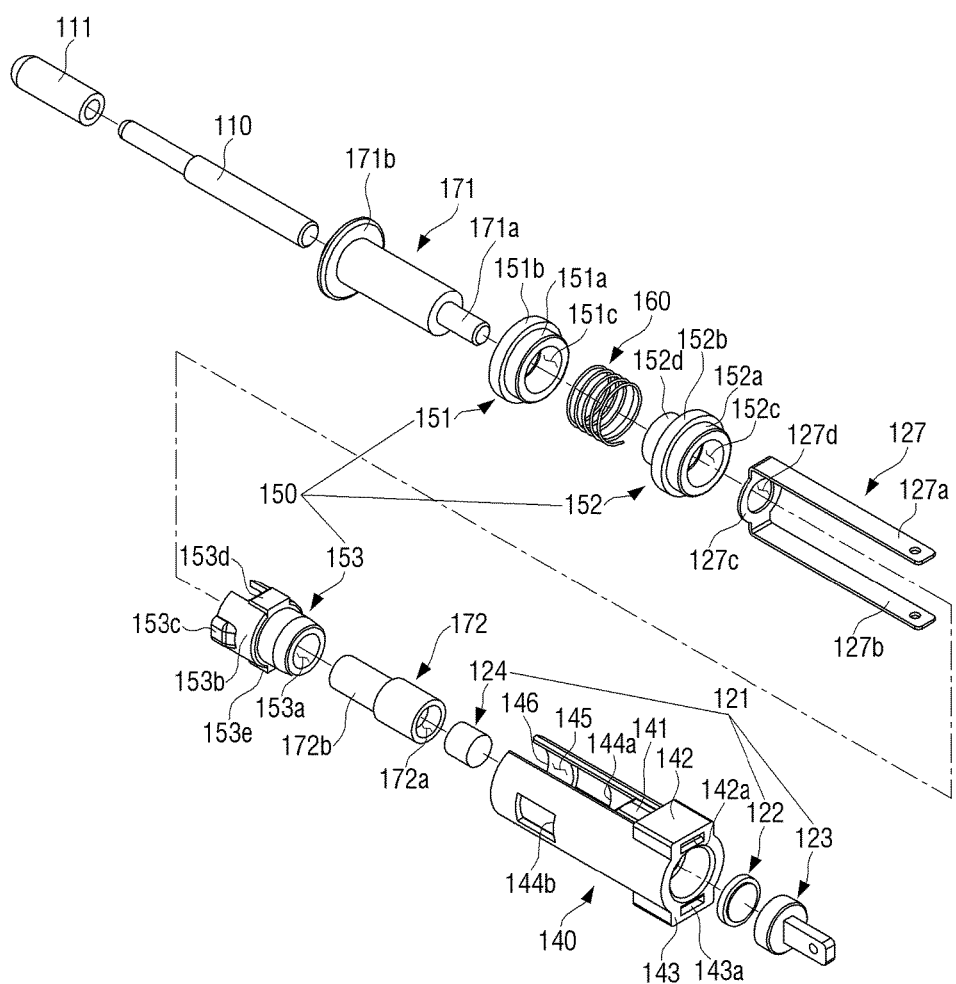
FIG. 5 is an exploded perspective view illustrating a writing pressure module of the stylus pen of FIG. 3, according to an exemplary embodiment.

FIG. 4 is a perspective view illustrating a writing pressure module 190' of the stylus pen of FIG. 3, and FIG. 5 is an exploded perspective view illustrating a writing pressure module 190' of the stylus pen of FIG. 3.

Referring to FIGS. 4 and 5, a writing pressure module 190' of the stylus pen 100 according to an exemplary embodiment may include a variable capacitor 121, a conductive tip 110, an elastic member 160, a housing 140, an insulator 150, a conductive body 127, a first conductive support member 171, and a second conductive support member 172.

The conductive tip 110 is disposed in a front end of the stylus pen 100, and, when the stylus pen 100 is placed on the touch panel 200, receives a pressure depending on a writing pressure of a user. The conductive tip 110 may receive an electric field transmission signal that is generated in at least one electrode among the plurality of electrodes included in the touch panel 200. According to an exemplary embodiment, in order to prevent the conductive tip 110 from being in direct contact with the outside, an insulating portion 111 may be disposed in the outer surface of the conductive tip 110.

The variable capacitor 121 is physically connected to the conductive tip 110 via the housing 140, etc., and a pressure is applied to the variable capacitor 121 in accordance with a longitudinal movement of the conductive tip 110. The variable capacitor 121 includes a dielectric 122, a first electrode 123, and a conductive variable electrode 124. A specific form of the dielectric 122 according to an exemplary embodiment will be described below with reference to FIG. 6, a specific form of the first electrode 123 according to an exemplary embodiment will be described below with reference to FIG. 7, and a specific form of the conductive variable electrode 124 according to one or more exemplary embodiments will be described below with reference to FIGS. 8 to 12.

The conductive body 127 electrically connects the conductive tip 110 and the parallel resonance circuit. In detail, the conductive body 127 is arranged outside the variable capacitor 121, and may electrically connect the conductive tip 110 and the parallel resonance circuit. A specific shape of the conductive body 127 according to an exemplary embodiment will be described below with reference to FIG. 13.

The housing 140 has a tube shape to receive the variable capacitor 121. A specific shape of the housing 140 according to an exemplary embodiment will be described below with reference to FIG. 14.

The insulator 150 is arranged on an outer circumferential surface of the conductive tip 110. In detail, the insulator 150 may include a first cap and a second cap. A specific operation and configuration of the insulator 150 according to one or more exemplary embodiments will be described below with reference to FIGS. 15 and 16.

The elastic member 160 restores the position of the conductive tip 110. In detail, the elastic member 160 may press a guide member 153 in a direction away from a projection 141 formed (e.g., provided) on an inner circumferential surface of the housing 140.

Figure 17A:
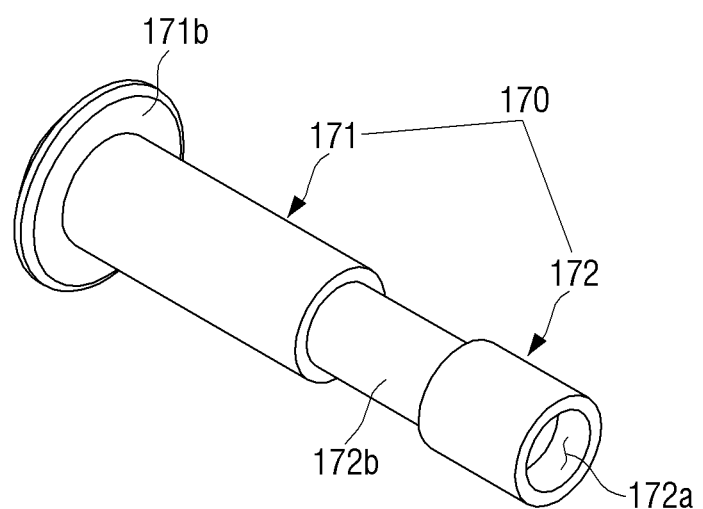
FIGS. 17A and 17B are perspective views illustrating a state in which a first conductive supporting member and a second conductive supporting member of FIG. 5 are coupled to each other, according to an exemplary embodiment.

A receiving groove is formed in each of opposite ends of the conductive support member 170 (see FIG. 17A). The insulator 150 is disposed on the outer circumferential surface of the conductive support member 170 so that the conductive support member 170 is insulated from the elastic member 160. A specific function and form of the conductive support member 170 according to one or more exemplary embodiments will be described below with reference to FIGS. 17A and 17B.

Figure 6:
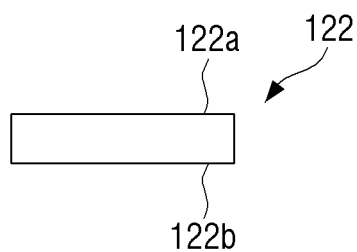
FIG. 6 is a cross-sectional view illustrating a dielectric of a variable capacitor of FIG. 5, according to an exemplary embodiment.

FIG. 6 is a cross-sectional view illustrating the dielectric 122 of the variable capacitor 121 of FIG. 5, according to an exemplary embodiment.

Referring to FIG. 6, the dielectric 122 may be formed in a circular disk shape having a predetermined thickness. The dielectric 122 includes a first surface 122a and a second surface 122b located opposite the first surface 122a. The dielectric 122 may have a predetermined permittivity.

The dielectric 122 may be received in an opening formed in the other end of the housing 140, which will be described hereinafter, so that the first surface 122a and the second surface 122b of the dielectric 122 are perpendicular to the lengthwise direction of the housing 140. The first surface 122a of the dielectric 122 received in the opening may be in contact with the first electrode 123 of the variable capacitor 121, and the second surface 122b of the dielectric 122 may be spaced away from and face the conductive variable electrode 124 of the variable capacitor 121.

Figure 7:
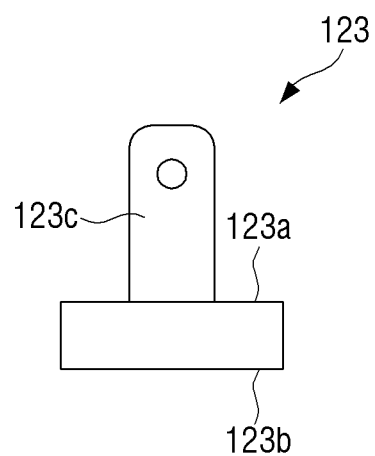
FIG. 7 is a cross-sectional view illustrating a first electrode of a variable capacitor of FIG. 5, according to an exemplary embodiment.

FIG. 7 is a cross-sectional view illustrating the first electrode 123 of the variable capacitor 121 of FIG. 5, according to an exemplary embodiment.

Referring to FIG. 7, the first electrode 123 may be formed in a circular disk shape having a predetermined thickness. The first electrode 123 includes a first surface 123a and a second surface 123b located opposite the first surface 123a.

The first electrode 123 is disposed so that the first surface 123a and the second surface 123b of the first electrode 123 are perpendicular to the lengthwise direction of the housing 140. The first surface 123a is electrically connected directly to one end of the parallel resonance circuit, and the second surface 123b may be in contact with the first surface 122a of the dielectric 122. Also, the first electrode 123 may include a projection part 123c that is formed on the first surface 123a that is directly connected to the one end of the parallel resonance circuit and that extends in the lengthwise direction of the housing 140. Here, the size of the second surface 123b may be the same as or greater than the size of the first surface 122a of the dielectric 122.

Figure 8:
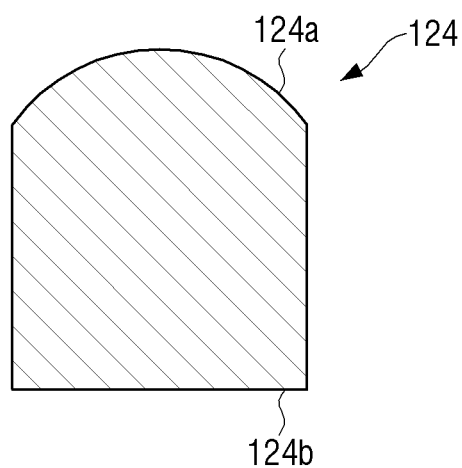
FIG. 8 is a cross-sectional view illustrating a conductive variable electrode of a variable capacitor of FIG. 5, according to an exemplary embodiment.

FIG. 8 is a cross-sectional view illustrating the conductive variable electrode 124 of the variable capacitor 121 of FIG. 5, according to an exemplary embodiment.

Referring to FIG. 8, the conductive variable electrode 124 may be formed in a cylindrical shape extending in the lengthwise direction of the housing 140. One end surface 124a of the conductive variable electrode 124 may be formed so that a central portion thereof is convex from an edge portion thereof toward the outside of the one end surface 124a, and the other end surface 124b of the conductive variable electrode 124 may be flat.

The one end surface 124a of the conductive variable electrode 124 may be disposed away from the second surface 123b of the dielectric 122, and the other end surface 124b of the conductive variable electrode 124 may receive a pressure applied by the conductive tip 110.

When the other end surface 124b of the conductive variable electrode 124 receives the pressure being applied through the conductive tip 110, the one end surface 124a thereof may immediately be in contact with the second surface 122b of the dielectric 122.

If the pressure is continuously being applied through the conductive tip 110, the one end surface 124a of the conductive variable electrode 124 may press the second surface 123b of the dielectric 122 in a direction in which the pressure is being applied. Accordingly, a contact area between the one end surface 124a of the conductive variable electrode 124 and the second surface 122b of the dielectric 122 may be increased.

If the pressure being applied through the conductive tip 110 is decreased, an amount of the force that causes the one end surface 124a of the conductive variable electrode 124 to press the second surface 122b of the dielectric 122 is also reduced. Accordingly, the contact area between the one end surface 124a of the conductive variable electrode 124 and the second surface 122b of the dielectric 122 may be decreased.

If the pressure applied through the conductive tip 110 is completely removed, the one end surface 124a of the conductive variable electrode 124 does not press the second surface 122b of the dielectric 122, whereby the one end surface 124a of the conductive variable electrode 124 and the second surface 122b of the dielectric 122 may be spaced apart from each other by the elastic member 160, which will be described hereinafter.

Figure 9:
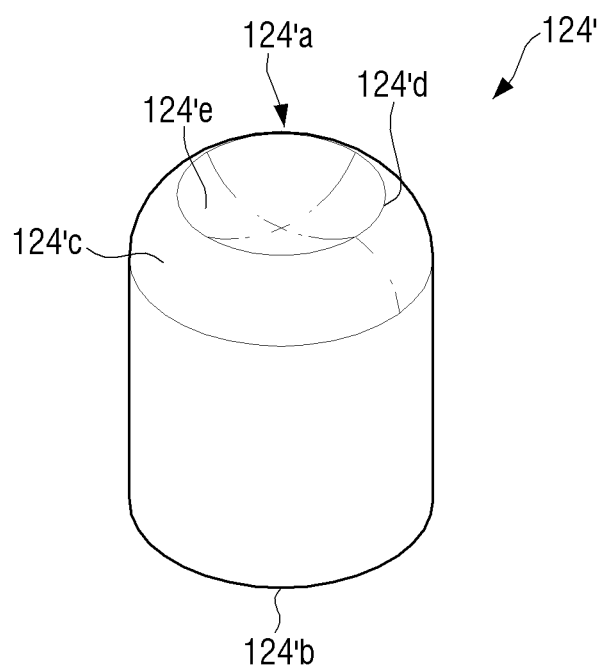
FIG. 9 is a perspective view illustrating another example of a conductive variable electrode of a variable capacitor of FIG. 5, according to an exemplary embodiment.
Figure 10:
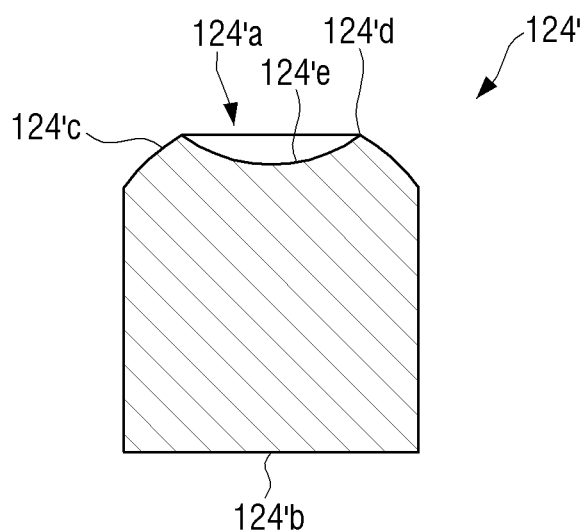
FIG. 10 is a cross-sectional view illustrating the conductive variable electrode of FIG. 9.

FIG. 9 is a perspective view illustrating another example of a conductive variable electrode 124' of the variable capacitor 121 of FIG. 5, and FIG. 10 is a cross-sectional view illustrating the conductive variable electrode 124' of FIG. 9.

Referring to FIGS. 9 and 10, the conductive variable electrode 124' may be formed in a cylindrical shape extending in the lengthwise direction of the housing 140. One end surface 124'a of the conductive variable electrode 124' may be formed so that an edge portion 124'c is inclined upwardly toward a central portion of the one end surface 124'a and the center portion is formed in a recessed portion 124'e. Accordingly, a boundary 124'd between the edge portion 124'c and the recessed portion 124'e may be formed to project outwardly from the one end surface 124'a.

When the other end surface 124'b of the conductive variable electrode 124' receives the pressure being applied through the conductive tip 110, the boundary 124'd formed to project from the one end surface 124'a may immediately be in contact with the second surface 122b of the dielectric 122, thereby forming a ring-shaped contact area having a hollow. In this case, the contact area is different for the same pressure.

The change of the contact area according to change in the pressure applied through the conductive tip 110 is the same as that of the conductive variable electrode 124 according to the preceding exemplary embodiment; therefore, a redundant description thereof is omitted herein.

It is understood that the conductive variable electrode 124 may be formed in various shapes without being limited to the above-described shapes.

Furthermore, the conductive variable electrode 124 may be formed of (e.g., include) a conductive rubber. Although rubber is generally an insulating material, the rubber may have conductivity by blending a conductive material such as metal or carbon. If the pressure being applied to the conductive variable electrode 124 through the conductive tip 110 is removed, the conductive variable electrode 124 may recover an original position by the elasticity of the conductive rubber. As the original position is recovered, the contact area between the one end surface 124a of the conductive variable electrode 124 and the second surface 122b of the dielectric 122 may be reduced.

Figure 11:
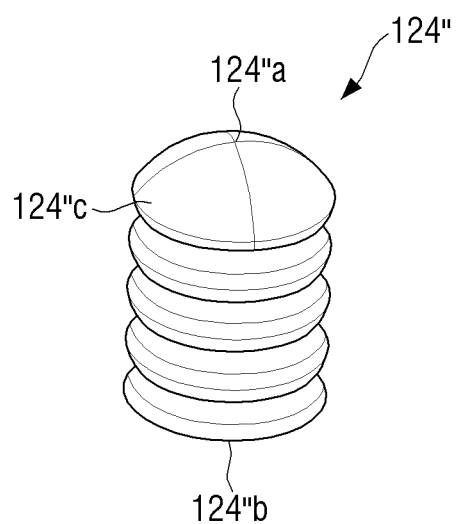
FIG. 11 is a perspective view illustrating still another example of a conductive variable electrode forming a variable capacitor of FIG. 5.
Figure 12:
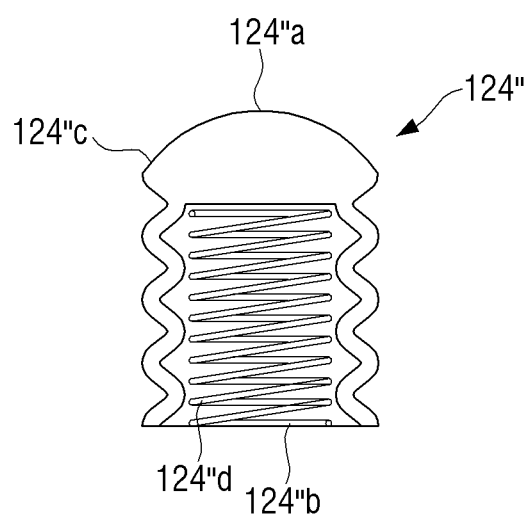
FIG. 12 is a cross-sectional view illustrating the conductive variable electrode of FIG. 11.

FIG. 11 is a perspective view illustrating still another example of a conductive variable electrode 124" of the variable capacitor 121 of FIG. 5, and FIG. 12 is a cross-sectional view illustrating the conductive variable electrode 124" of FIG. 11.

Referring to FIGS. 11 and 12, the conductive variable electrode 124" includes one end surface 124"a, an other end surface 124"b, and an edge portion 124"c. Furthermore, an elastic member 124"d is inserted in the conductive variable electrode 124" so that the elastic force of the conductive variable electrode 124" may be reinforced. The elastic member 124"d may be inserted in the conductive variable electrode made of (e.g., including) a conductive rubber. The contact area between the conductive variable electrode 124" and the second surface 122b of the dielectric 122 may be changed in accordance with the elasticity of the conductive rubber as well as the pressure that is transmitted through the conductive tip 110. For example, if the pressure that is transmitted through the conductive tip 110 is the same, the greater the elasticity of the conductive rubber is, the smaller the contact area between the conductive variable electrode 124" and the second surface 122b of the dielectric 122 is.

Accordingly, the size of the capacitance of the variable capacitor 121 may be varied according to the size of the contact area between the conductive variable electrode 124 and the second surface 122b of the dielectric 122. The size of the contact area may vary depending on the shape and elasticity of the conductive variable electrode 124, if the pressure transmitted through the conductive tip 110 is the same.

The relationship between the size of the capacitance of the variable capacitor 121 and the contact area between the conductive variable electrode 124 and the second surface 122b of the dielectric 122 may be measured in advance. The pressure applied to the conductive tip 110 may be determined from the capacitance of the variable capacitor 121 on the basis of the previously measured values.

As described above, the contact area between the one end surface 124a of the conductive variable electrode 124 and the second surface 122b of the dielectric 122 may vary depending on the change in the pressure applied through the conductive tip 110 so that the capacitance of the variable capacitor 121, namely, the electrostatic capacity, may be varied.

On the other hand, if the elastic member 124"d is disposed inside the conductive variable electrode 124" as illustrated in FIGS. 11 and 12, the elastic member 160 as illustrated in FIGS. 4 and 5 may be omitted. By disposing the elastic member 124"d in the inside of the conductive variable electrode 124" as described above, the use of a separate elastic member 160 becomes unnecessary. Therefore, there are beneficial effects in the dimensional control, the ease of assembly, and the yield.

Furthermore, it is understood that, although the variable capacitor 121 as described above is in the shape of a circular disc, one or more other exemplary embodiments are not limited thereto. For example, according to another exemplary embodiment, the variable capacitor 121 may be implemented in the form of a polygonal disc. In this case, the dielectric of the variable capacitor 121 and the first surface of the first electrode 123 may be formed in a polygonal shape as well.

Figure 13:
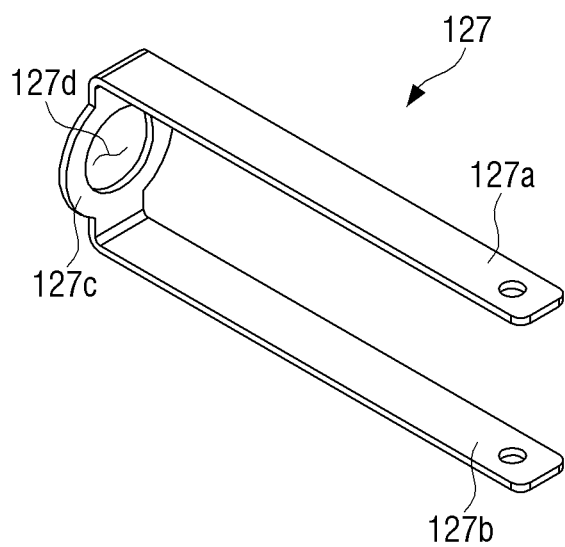
FIG. 13 is a perspective view illustrating a conductive body of FIG. 5, according to an exemplary embodiment.

FIG. 13 is a perspective view illustrating a conductive body 127 of FIG. 5, according to an exemplary embodiment.

Referring to FIG. 13, the conductive body 127 may include a plurality of plates 127a and 127b that are spaced apart from each other and disposed side-by-side. The conductive body 127 may further include a circular member 127c that is connected to one end of each of the plurality of plates 127a and 127b.

The conductive body 127 may be provided with an opening 127d that is formed in a central portion of the circular member 127c. The conductive tip 110 and the conductive variable electrode 124 of the variable capacitor 121 may be disposed in the opening 127d. Accordingly, the conductive tip 110 and the conductive variable electrode 124 of the variable capacitor 121 may be electrically connected to the conductive body 127.

Also, the other ends of the plurality of plates 127a and 127b of the conductive body 127 that are spaced apart from each other and disposed side-by-side may be electrically connected to the other end of the parallel resonance circuit. Accordingly, the conductive body 127 may electrically connect the conductive variable electrode 124 of the variable capacitor 121 and the other end of the parallel resonance circuit.

Therefore, separate connecting members, such as terminals, are not required to connect the conductive variable electrode 124 of the variable capacitor 121 and the other end of the parallel resonance circuit. In detail, in order to connect the conductive variable electrode and the other end of the parallel resonance circuit in a related art, an elastic member is disposed outside the conductive variable electrode, and the conductive variable electrode and the parallel resonance circuit are connected by soldering a metal rod on one side of the elastic member. However, in the present exemplary embodiment, because soldering, etc., is not needed to connect the conductive variable electrode 124 and the other end of the parallel resonance circuit, mechanical stability is increased, and assembly and repair are made easier.

Figure 14:
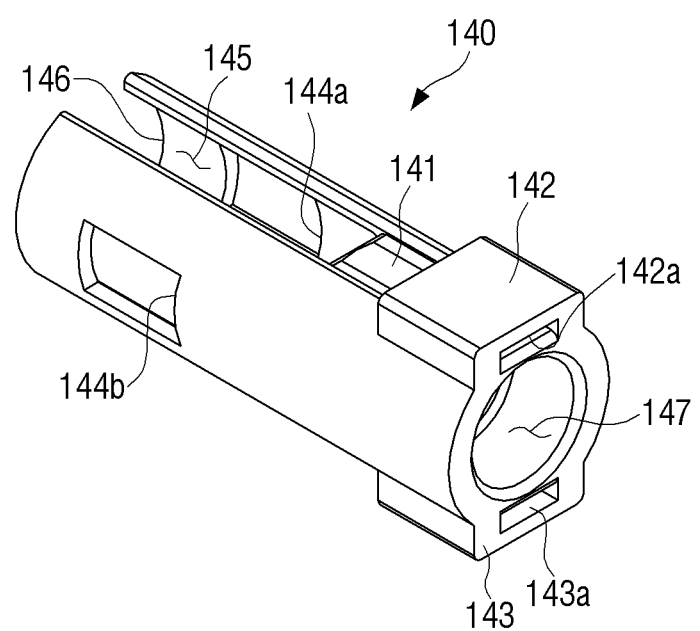
FIG. 14 is a perspective view illustrating a housing of FIG. 5, according to an exemplary embodiment.

FIG. 14 is a perspective view illustrating the housing 140 of FIG. 5, according to an exemplary embodiment.

Referring to FIG. 14, the housing 140 may be formed in a tube shape, and made of a non-conductive material.

The housing 140 may accommodate the variable capacitor 121 in an inside thereof, and an outer surface of the housing 140 may have at least one opening 145 that extends in the lengthwise direction from one end of the housing 140. The plurality of plates 127a and 127b of the conductive body 127 may pass through the at least one opening 145.

In detail, an opening 146 through which the conductive tip 110 passes may be formed in one end of the housing 140, and an opening 147 may be formed in the other end of housing 140 in which the first electrode 123 of the variable capacitor 121 is positioned.

Because the at least one opening 145 through which the plurality of plates 127a and 127b of the conductive body 127 can pass is formed in the outer surface of the housing 140, the conductive body 127 connected to the conductive variable electrode 124 of the variable capacitor 121 may extend out of the housing 140 through the opening 145.

Accordingly, the housing 140 may electrically block the conductive variable electrode 124 from the first electrode 123 of the variable capacity 121 and the dielectric 122.

Also, at least one outer supporting portion 142 and 143 including guide slots 142a and 143a that the plurality of plates 127a and 127b of the conductive body 127 pass through and are guided by may be formed in the outer circumferential surface of the other end of the housing 140.

The plurality of plates 127a and 127b of the conductive body 127 that are supported by the outer supporting portions 142 and 143 may be disposed to be spaced apart from the first electrode 123 of the variable capacitor 121. Even when an external impact is applied, a risk of the conductive body 127 electrically connecting to the first electrode 123 of the variable capacitor 121 may be reduced, thereby providing stable operation.

Furthermore, a projection 141 of a ring shape capable of supporting the other end (e.g., second end) of the elastic member 160, which will be described below, may be formed in the inner circumferential surface of the housing 140.

Figure 15:
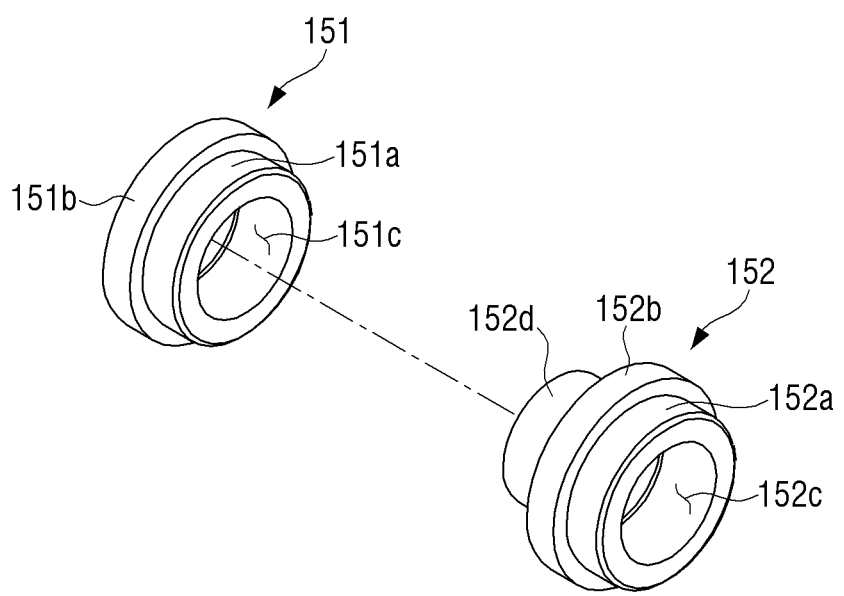
FIG. 15 is a perspective view illustrating a plurality of caps forming an insulator of FIG. 5, according to an exemplary embodiment.

FIG. 15 is a perspective view illustrating a plurality of caps 151 and 152 of the insulator 150 of FIG. 5, according to an exemplary embodiment.

Referring to FIG. 15, the insulator 150 may include, for example, a first cap 151 and a second cap 152. The first cap 151 may be spaced apart from an end (e.g., first end) of the housing 140, and be disposed to be fixed to the outer circumferential surface of the conductive tip 110, thereby supporting one end (e.g., first end) of the elastic member 160. The second cap 152 may be disposed in the end of the housing 140 and support the other end (e.g., second end) of the elastic member 160.

In detail, the first cap 151 may be formed in a ring shape extending in the lengthwise direction of the conductive tip 110, and includes an opening 151c through which the conductive tip 110 passes.

The first cap 151 includes a ring-shaped protrusion 151b that surrounds the outer circumferential surface 151a and has a predetermined height in the radial direction from the outer circumferential surface 151a.

The inner circumferential surface of the elastic member 160 may be arranged on the outer circumferential surface 151a of the first cap 151, and a side of the ring-shaped protrusion 151b formed on the outer circumferential surface 151a of the first cap 151 may contact and support the one end of the elastic member 160.

In detail, the second cap 152 may be formed in a ring shape extending in the lengthwise direction of the conductive tip 110, and includes an opening 152c through which the conductive tip 110 passes.

The second cap 152 includes a ring-shaped first protrusion 152b that surrounds the outer circumferential surface 152a and has a predetermined height in the radial direction from the outer circumferential surface 152a. Also, the second cap 152 may further include a ring-shaped second protrusion 152d extending in the lengthwise direction of the conductive tip 110 on the side surface of the second cap 152 facing the first cap 151. Accordingly, the inner circumferential surface of the elastic member 160 may be arranged on the outer circumferential surface of the second protrusion 152d, and a side of the first protrusion 152b of the second cap 152 may contact and support the other end of the elastic member 160.

Accordingly, the elastic member 160 may be pressed and contracted by the conductive tip 110 that moves in a direction in which the pressure is being applied. In this case, the elastic member 160, the other end of which is supported by the second cap 152, may press the first cap 151 in a direction away from the second cap 152. As a result, when the pressure is removed, the position of the conductive tip 110 fixed to the first cap 151 may be restored by the elastic member 160. Also, the conductive tip 110 may be isolated from the elastic member 160 by the first cap 151 and the second cap 152 of the insulator 150.

Figure 16:
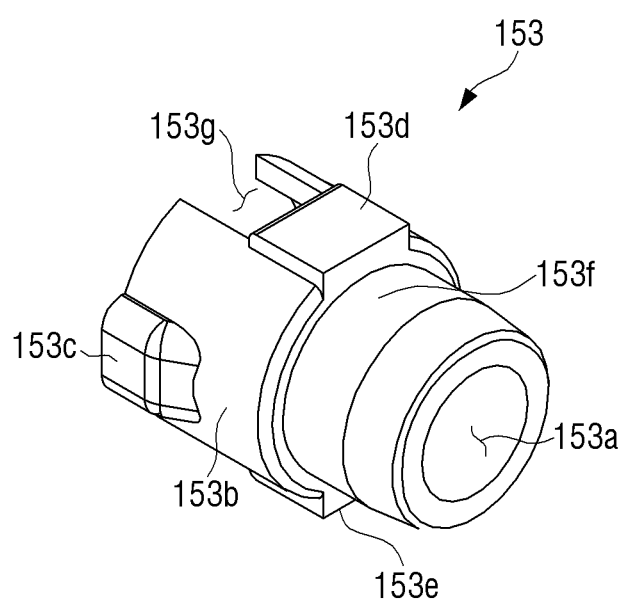
FIG. 16 is a perspective view illustrating a guide member forming an insulator of FIG. 5, according to an exemplary embodiment.

FIG. 16 is a perspective view illustrating a guide member 153 of the insulator 150 of FIG. 5, according to an exemplary embodiment.

Referring to FIG. 16, the insulator 150, as another example, may be formed as a guide member 153 that is disposed fixedly on the outer circumferential surface of the conductive tip 110 and guides the conductive tip 110 in the lengthwise direction of the housing 140.

In detail, the guide member 153 is provided with an opening 153a, and may be fixed to the outer circumferential surface of the conductive tip 110 that passes through the opening 153a.

The guide member 153 includes a ring-shaped protrusion 153b that surrounds the outer circumferential surface 153f and has a predetermined height in the radial direction from the outer circumferential surface 153f.

The ring-shaped protrusion 153b may provided with at least one opening 153g that extends in a lengthwise direction from the one end thereof, and through which the plurality of plates 127a and 127b of the conductive body 127 can pass. The plurality of plates 127a and 127b of the conductive body 127 passing through the at least one opening 153g may be supported by supporting portions 153d and 153e formed in the outer circumferential surface of the ring-shaped protrusion 153b, and may be extended to the outside of the guide member 153.

Side surfaces of the supporting portions 153d and 153e may support the one end of the elastic member 160.

Also, the guide member 153 is provided with at least one projecting portion 153c that is formed on the outer circumferential surface of the ring-shaped protrusion 153b and may be received in at least one elongated hole 144a and 144b formed in the lengthwise direction of the housing 140 on the side surface of the housing 140.

As the at least one projecting portion 153c is received in the at least one elongated hole 144a and 144b formed on the side surface of the housing 140, the guide member 153 may be guided in the lengthwise direction of the housing 140 while disposed within the housing 140.

Also, as the guide member 153 is guided in the lengthwise direction of the housing 140, the conductive tip 110 fixed to the guide member 153 may be guided in the lengthwise direction of the housing 140 as well.

Accordingly, when the conductive tip 110 is moved in the direction in which the pressure is applied, the elastic member 160, the other end of which is supported by the projection 141 formed on the inner circumferential surface of the housing 140, may be pressed and contracted. In this case, the elastic member 160 may press the guide member 153 in a direction away from the projection 141 that is formed in the inner circumferential surface of the housing 140. As a result, when the pressure is removed, the position of the conductive tip 110 may be restored by the elastic member 160. Also, the guide member 153 of the insulator 150 may insulate the elastic member 160 from the conductive tip 110.

Figure 17B:
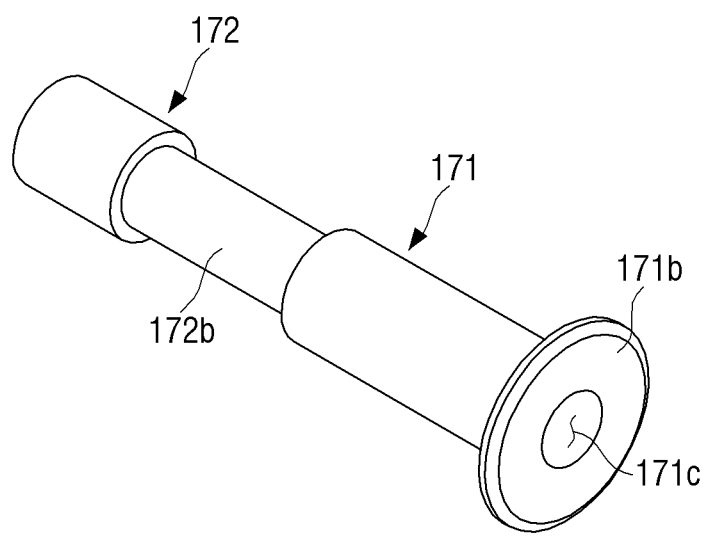

FIGS. 17A and 17B are perspective views illustrating a state in which a first conductive supporting member 171 and a second conductive supporting member 172 of FIG. 5 are coupled to each other, according to an exemplary embodiment.

Referring to FIGS. 17A and 17B, the conductive support member 170 may include one end portion that is partially accommodated in the housing 140 and disposed within the housing 140 and the other end portion that is disposed in the outside of the one end of the housing 140. Also, the conductive support member 170 may include receiving holes 171c and 172a that are formed in opposite ends of the support member 170.

In detail, the conductive support member 170 may be provided with a first receiving hole 171c that is formed in the other end of the conductive support member 170 and is connected to the one end portion of the conductive tip 110, and a second receiving hole 172a that is formed in the one end of the conductive support member 170 and is connected to the conductive variable electrode 124.

The conductive support member 170 may include a first conductive support member and a second conductive support member 172.

The first receiving hole 171c that can receive the conductive tip 110 is formed in the other end of the first conductive support member 171, and the other end thereof may extend outwardly along the radial direction. The outer circumferential surface of the first conductive support member 171 may contact and support the inner circumferential surfaces of the first cap 151 and the second cap 152, and the first cap 151 may be seated on and fixed to an outer extension portion 171b extending outwardly.

The second conductive support member 172 may be provided with the second receiving hole 172a that can receive the conductive variable electrode 124 of the variable capacitor 121 and is formed in one end of the second conductive support member 172. Also, the other end portion 172b of the second conductive support member 172 may be formed to have the same diameter as that of the opening 153a of the guide member 153 so that the inner circumferential surface of the opening 153a of the guide member 153 can be seated on the other end portion 172b. Also, referring to FIG. 20, a third receiving hole 172c that can receive the one end portion of the first conductive support member 171 may be formed in the other end of the second conductive support member 172.

If the receiving hole 171c in which the conductive tip 110 is received is loosened by the forces that are applied to the conductive tip 110 in different directions, only the first conductive support member 171 having the receiving hole 171c to which the conductive tip 110 is coupled may need to be replaced. Accordingly, maintenance of the stylus pen 100 may be easily performed.

When the contact pressure between the touch panel 200 and the stylus pen 100 is applied to the conductive support member 170 through the conductive tip 110, the conductive support member 170 may transmit the applied pressure to the conductive variable electrode 124 of the variable capacitor 121. The pressure transmitted by the conductive support member 170 may transform the conductive variable electrode 124 of the variable capacitor 121.

The operation in which the capacitance of the variable capacitor 121 is varied according to the pressure being applied through the conductive tip 110 is the same as or similar to that described above; therefore, a redundant description thereof is omitted herein.

Figure 18:
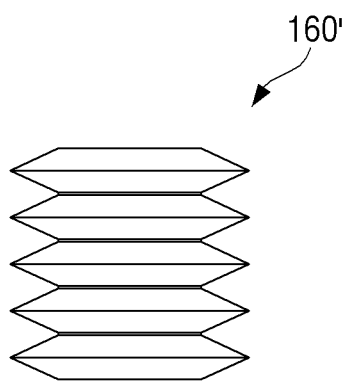
FIG. 18 is a side view illustrating another example of an elastic member of FIG. 5, according to an exemplary embodiment.
Figure 19:
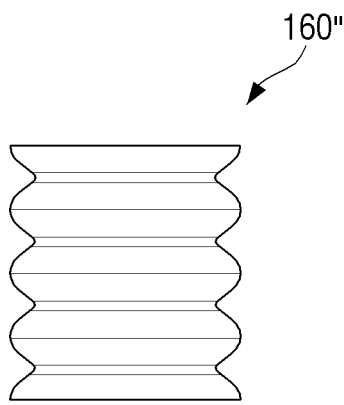
FIG. 19 is a side view illustrating still another example of an elastic member of FIG. 5, according to an exemplary embodiment.

FIG. 18 is a side view illustrating another example of an elastic member 160' of FIG. 5, and FIG. 19 is a side view illustrating still another example of an elastic member 160" of FIG. 5.

Referring to FIG. 18, the elastic member 160' according to another exemplary embodiment may be formed of a leaf spring, and referring to FIG. 19, the elastic member 160" according to another exemplary embodiment may be formed of a bellows spring. Because the leaf spring as illustrated in FIG. 18 or the bellows spring as illustrated in FIG. 19 may be formed so that the external surface thereof is wrapped by the insulator 150, the leaf spring or the bellows spring may be isolated from the conductive tip 110 or the conductive support member 170.

Figure 20:
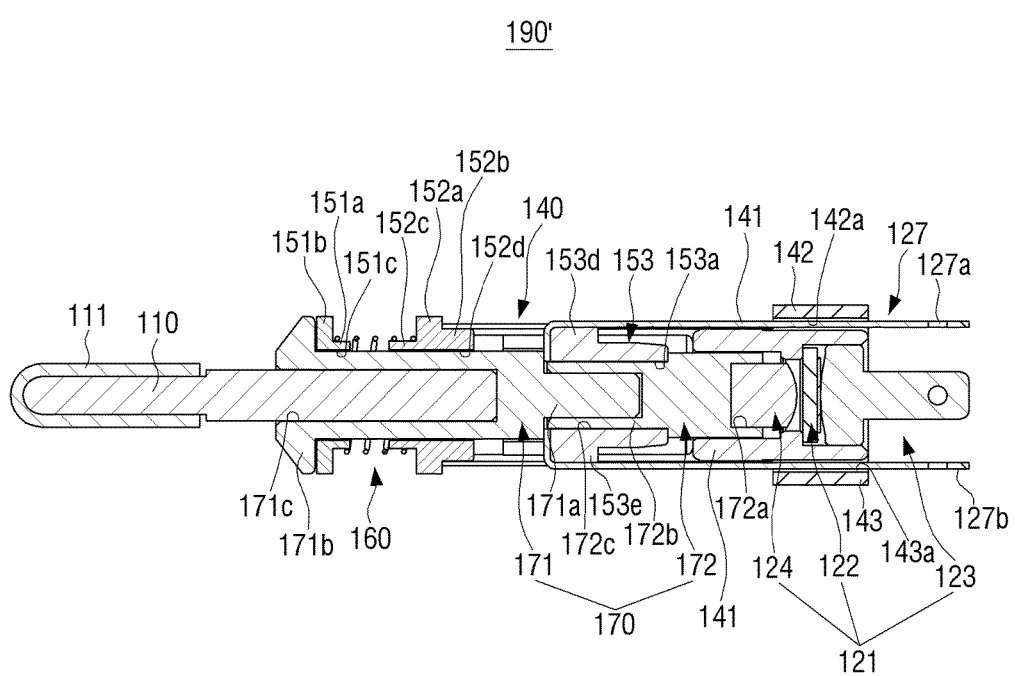
FIG. 20 is a cross-sectional view taken along a I-I line in FIG. 4.

FIG. 20 is a cross-sectional view taken along a I-I line in FIG. 4, according to an exemplary embodiment.

Referring to FIG. 20, a writing pressure module 190' in which the elastic member 160 is disposed between the first cap 151 and the second cap 152 is illustrated.

Figure 21:
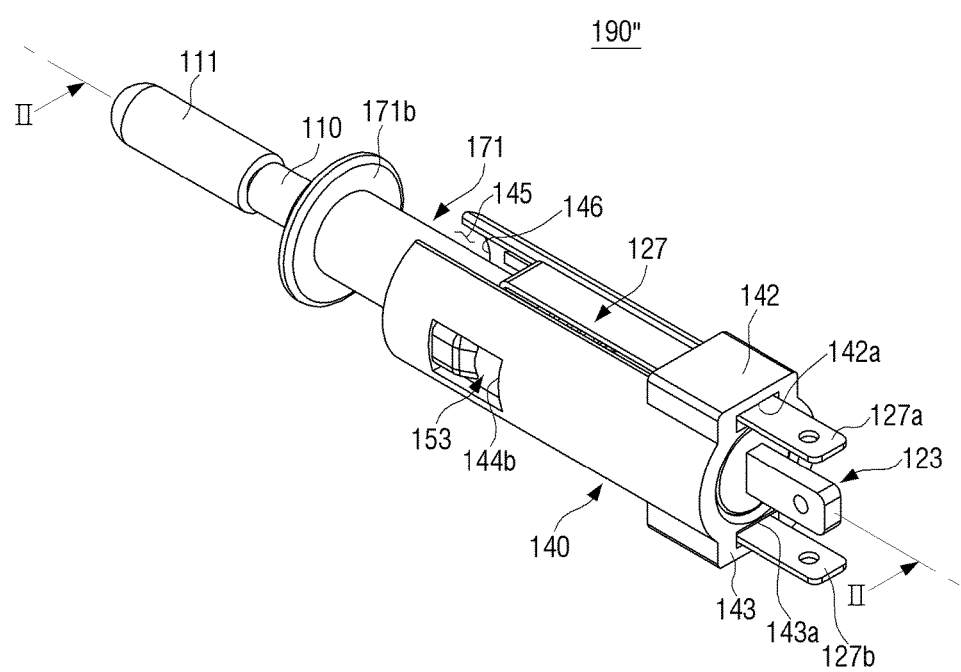
FIG. 21 is a perspective view illustrating another example of a writing pressure module of the stylus pen of FIG. 3, according to an exemplary embodiment.
Figure 22:
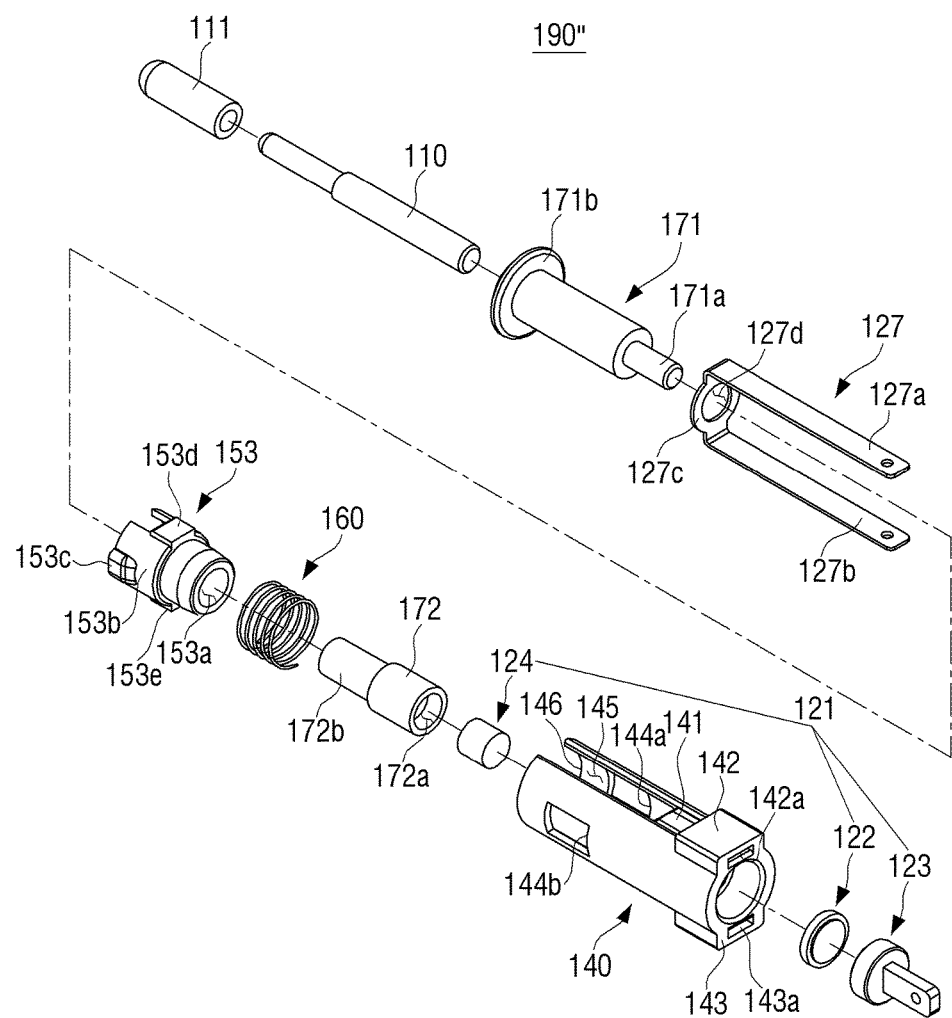
FIG. 22 is an exploded perspective view illustrating the writing pressure module of FIG. 21, according to an exemplary embodiment.
Figure 23:
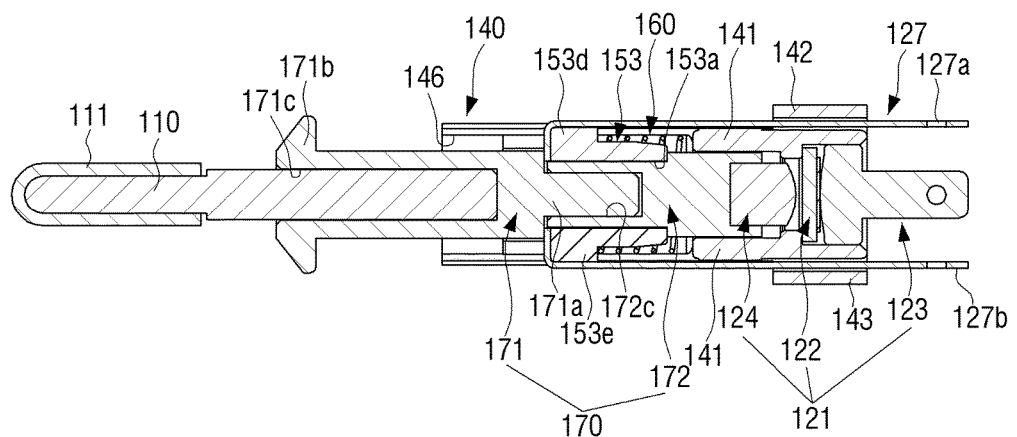
FIG. 23 is a cross-sectional view taken along a II-II line in FIG. 21, according to an exemplary embodiment.

FIG. 21 is a perspective view illustrating another example of a writing pressure module 190" of the stylus pen 100 of FIG. 3, according to an exemplary embodiment. FIG. 22 is an exploded perspective view illustrating the writing pressure module 190" of FIG. 21, according to an exemplary embodiment. FIG. 23 is a cross-sectional view taken along a II-II line in FIG. 21, according to an exemplary embodiment.

Referring to FIGS. 21 to 23, a perspective view of the writing pressure module 190" in which the elastic member 160 is disposed between the guide member 153 and the inner circumferential surface of the housing 140 is illustrated. In this case, the first cap 151 and the second camp 152 may be omitted. Additionally, in the present exemplary embodiment, the guide member 153 supports a first end of the elastic member 160 and a projection 141 on the inner circumferential surface of the housing 140 supports a second end of the elastic member 160. The configuration and operation of the writing pressure module 190" are the same as or similar to those of the writing pressure module 190' in which the elastic member 160 is disposed between the first cap 151 and the second cap 152; therefore, a redundant description thereof is omitted herein.

Figure 24:
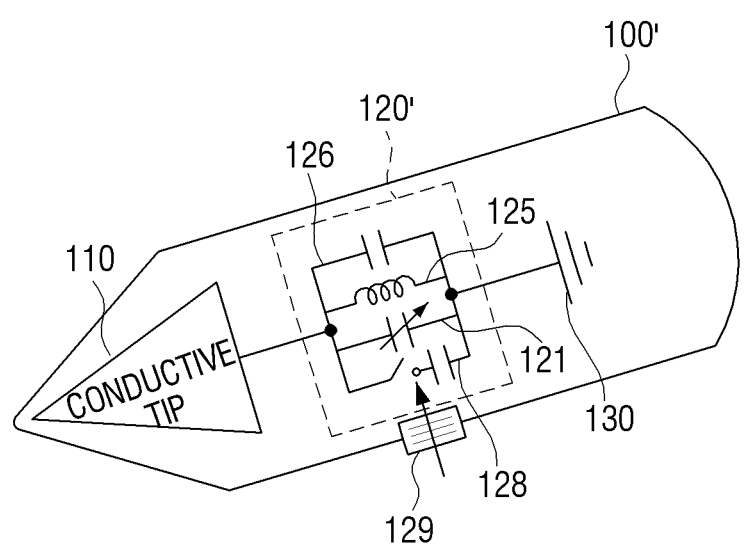
FIG. 24 is a view illustrating a circuit diagram of a stylus pen according to a second exemplary embodiment.

FIG. 24 is a view illustrating a circuit diagram of a stylus pen 100' according to another exemplary embodiment.

Referring to FIG. 24, a resonance circuit portion 120' may include an inductor 125, a capacitor 126, a variable capacitor 121, a second capacitor 128, and a switch 129.

The inductor 125 and the capacitor 126 are connected in parallel and operate as a parallel resonance circuit. The parallel resonance circuit may have high-impedance characteristics at a specific resonance frequency.

Because the variable capacitor 121 is electrically connected in parallel with the parallel resonance circuit and is physically connected to the conductive tip 110, the capacitance thereof may be varied depending on the contact pressure of the conductive tip 110. Accordingly, when the contact pressure of the conductive tip 110 is varied, the capacitance of the variable capacitor 121 is changed, and thus the capacitance of the resonance system is also varied so that the resonance frequency may be varied.

The second capacitor 128 has a predetermined capacitance, and is connected in parallel with the above-described parallel resonance circuit.

The switch 129 may receive a user's on/off command, and allows the second capacitor 128 to be selectively connected in parallel with the parallel resonance circuit according to the user's on/off command. Accordingly, when the user turns on the switch 129, the second capacitor 128 is connected in parallel with the parallel resonance circuit so that the resonance frequency of the resonance system is varied. At this time, the varied resonance frequency may be different from the variation range of the variable capacitor 121 as described above. For example, if the variation range of the resonance frequency according to the change of the variable capacitor 121 is within 5 kHz, the variation range of the resonance frequency according to the operation of the switch 129 may exceed 5 kHz. Accordingly, the touch panel 200 may detect whether the change in the resonance frequency is due to changes in the variable capacitor 121 or due to the on/off operation of the switch 129 through the range of the varied resonance frequency. Also, it may be implemented so that a change in the resonance frequency caused by the variable capacitor 121 and a change in the resonance frequency caused by the switch 129 are concurrently performed.

As described above, because the stylus pen 100' according to a second exemplary embodiment is formed so that the resonance frequency is varied according to the user's switch operation, the touch panel 200 can easily detect the operation mode of the stylus pen 100'.

In the above-described exemplary embodiment, the second capacitor 128 that is connected in series with the switch is used to vary the resonance frequency. However, it is understood that one or more other exemplary embodiments are not limited thereto. For example, according to another exemplary embodiment, the resonance circuit portion 120' may be implemented to perform the above-described function by using an inductor or other circuit components instead of the capacitor.

Figure 25:
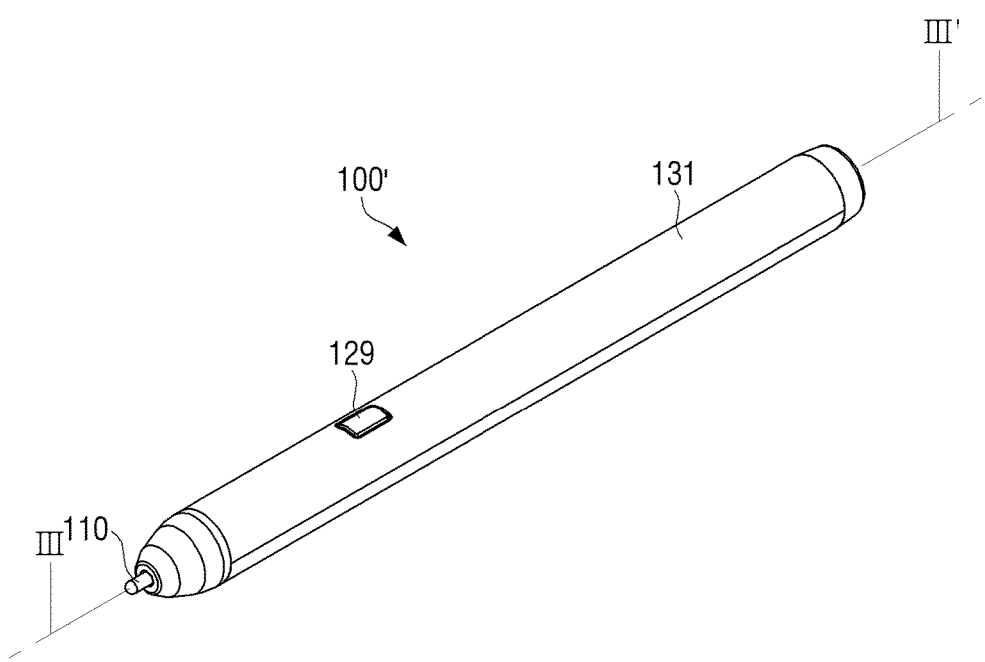
FIG. 25 is a perspective view illustrating a stylus pen according to a second exemplary embodiment.
Figure 26:
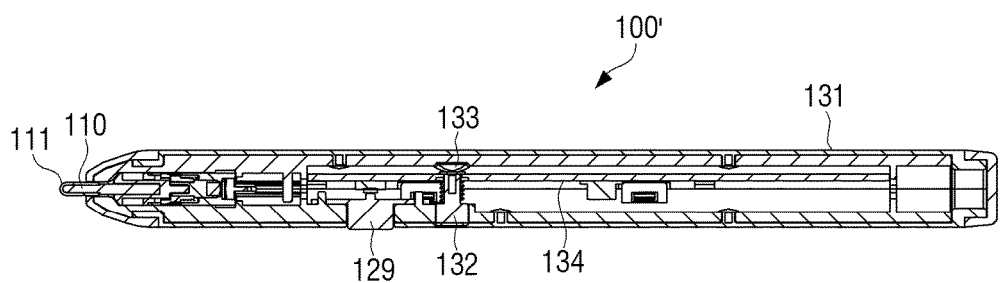
FIG. 26 is a cross-sectional view taken along a III-III line in FIG. 25, according to an exemplary embodiment.

FIG. 25 is a perspective view illustrating a stylus pen 100' according to a second exemplary embodiment, and FIG. 26 is a cross-sectional view taken along a III-III line in FIG. 25.

Referring to FIGS. 25 and 26, the stylus pen 100' according to a second exemplary embodiment may be provided with a switch 129 that is disposed on the outer surface thereof and can be operated by a user. A conductive case 131 is arranged on the outer surface such that a portion of the parallel resonance circuit is grounded to the ground by the user's gripping action. The stylus pen 100' includes a connecting portion 132 having a screw 133 that is connected to the conductive case 131 through a printed circuit board (PCB) 134 in order to electrically connect the conductive case 131 and the PCB 134 including the parallel resonance circuit.

The conductive case 131 is isolated from the conductive body 127, and is electrically connected to the ground within the PCB 134.

In the stylus pen 100 according to a first exemplary embodiment, the conductive case 131 was not described. However, it is understood that, other than a hole in which the switch 129 is disposed, the conductive case 131 as illustrated in FIGS. 25 and 26 may equally be applied to the stylus pen 100 according to the first exemplary embodiment.

Figure 27:
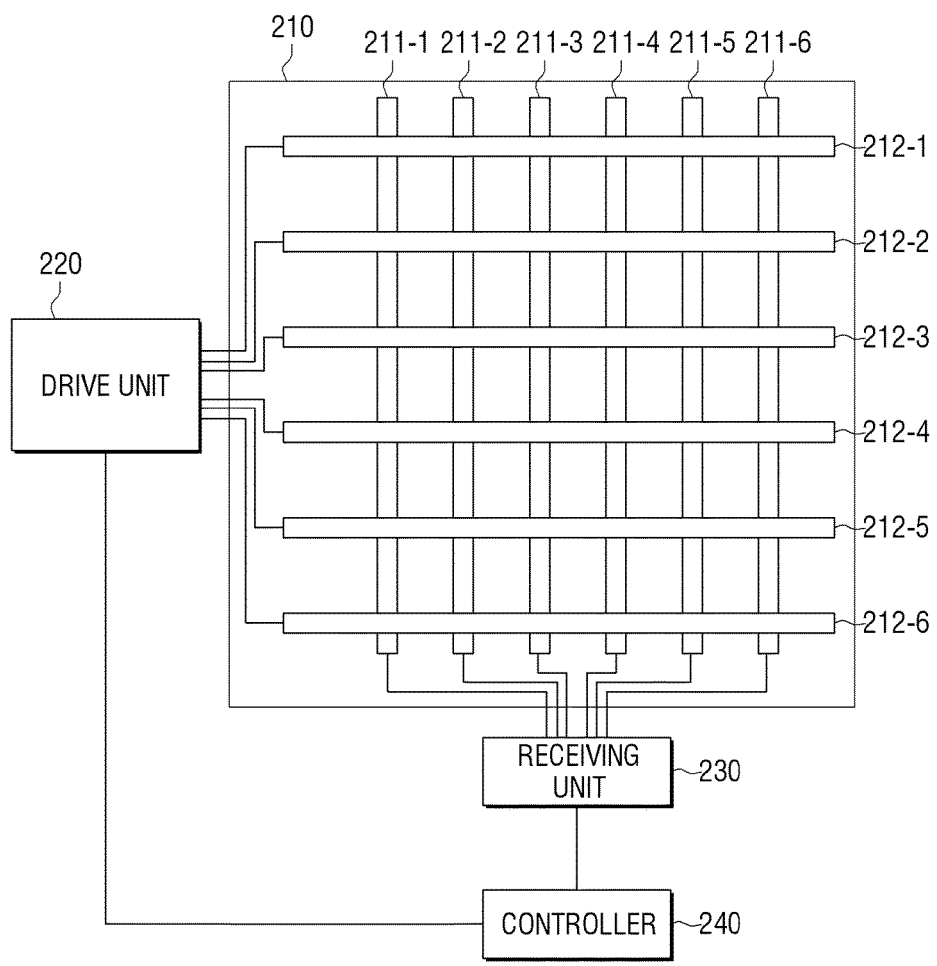
FIG. 27 is a block diagram illustrating a specific configuration of a touch panel of FIG. 1, according to an exemplary embodiment.

FIG. 27 is a block diagram illustrating a specific configuration of the touch panel 200 of FIG. 1, according to an exemplary embodiment.

Referring to FIG. 27, the touch panel 200 may include a channel electrode portion 210, a drive unit 220 (e.g., drive or driver), a receiving unit 230 (e.g., receiver), and a controller 240.

The channel electrode portion 210 includes a plurality of electrodes. In detail, the channel electrode portion 210 may include a plurality of electrodes disposed in a matrix form. For example, the channel electrode portion 210 may include a first electrode group disposed in a first direction and a second electrode group disposed in a second direction perpendicular to the first direction.

The first electrode group may include a plurality of first electrodes 211-1, 211-2, 211-3, 211-4, 211-5, and 211-6 disposed in the first direction (e.g., a vertical direction). Here, the first electrode is a transparent electrode, and may be formed of indium tin oxide (ITO). The plurality of first electrodes 211-1, 211-2, 211-3, 211-4, 211-5, and 211-6 of the first electrode group may be transmission electrodes for transmitting a predetermined transmission signal (Tx signal) when detecting a position of a finger.

The second electrode group may include a plurality of second electrodes 212-1, 212-2, 212-3, 212-4, 212-5, and 212-6 disposed in the second direction (e.g., a horizontal direction). Here, the second electrode is a transparent electrode, and may be formed of indium tin oxide (ITO). The plurality of second electrodes 212-1, 212-2, 212-3, 212-4, 212-5, and 212-6 of the second electrode group 212 may be receiving electrodes for receiving an Rx signal caused by the Tx signal which is input from the first electrode when detecting a position of a finger.

While in the exemplary embodiment of FIG. 27 there is illustrated that the first electrode group and the second electrode group each include only six electrodes, it is understood that one or more other exemplary embodiments are not limited thereto. For example, in one or more other exemplary embodiments, the first electrode group and the second electrode group may each include more than six electrodes or less than six electrodes. Furthermore, while in FIG. 27, the electrodes of the first electrode group and the second electrode group are illustrated in a simple rectangular shape, it is understood that one or more other exemplary embodiments are not limited thereto. For example, according to another exemplary embodiment, the shape of each electrode may be more complex than the rectangular shape.

The drive unit 220 may transmit an electric field transmission signal (or a drive signal) to a resonance circuit of an object (e.g., input object) approaching the touch panel 200 through the capacitive coupling by applying the electric field transmission signal to electrodes of the channel electrode portion 210. At this time, the drive unit 220 may apply the same electric field transmission signal by a plurality of electrodes with respect to electrodes within the channel electrode portion 210. The electric field transmission signal may include a sine-wave signal having a predetermined resonance frequency.

The receiving unit 230 receives an electric field receiving signal in each electrode within the channel electrode portion 210 in the section in which the electric field transmission signal is not applied. In detail, the receiving unit 230 may sequentially receive the electric field receiving signals of all the electrodes by one electrode. Alternatively, the receiving unit 230 may receive the electric field receiving signals of all the electrodes by a plurality of electrodes.

The receiving unit 230 may perform a variety of signal processing for the received response signal (e.g., the electric field receiving signal). For example, the receiving unit 230 may amplify each response signal using an amplifier. The receiving unit 230 may perform signal processing for differentially amplifying the response signals by two response signals. The receiving unit 230 may perform signal processing of extracting only information of a predetermined frequency range among the received response signals.

The controller 240 may control the drive unit 220 and the receiving unit 230 so that applying of the electric field transmission signal and receiving of the electric field receiving signal for each electrode are alternately performed. For example, the controller 240 may control the drive unit 220 to simultaneously apply the same electric field transmission signals to all the first electrodes 211-1, 211-2, 211-3, 211-4, 211-5, and 211-6 in a first time interval, and may control the receiving unit 230 such that the response signal of at least one electrode (for example, 211-1) is received in a second time interval after the electric field transmission signal is applied. Subsequently, the controller 240 may control the drive unit 220 such that the same electric field transmission signals are simultaneously re-applied to all the first electrodes 211-1, 211-2, 211-3, 211-4, 211-5, and 211-6 in a third time interval, and may control the receiving unit 230 such that a response signal of another electrode (for example, 211-2) is received in a fourth time interval after the electric field transmission signal is applied. The controller 240 may repeat the above-described process as many times as the response signals for all the electrodes are received. In FIG. 27, because the channel electrode portion 210 includes twelve electrodes, the controller 240 may perform the applying/receiving operations twelve times, alternately.

If the response signals are received for all the electrodes, the controller 240 may determine the position of the stylus pen on the basis of the ratio of the response signals received in the first electrodes 211-1, 211-2, 211-3, 211-4, 211-5, and 211-6 and the ratio of the response signals received in the second electrodes 212-1, 212-2, 212-3, 212-4, 212-5, and 212-6.

For example, if the size of the response signal of one first electrode 211-3 is greater than the size of the response signals of the other first electrodes 211-1, 211-2, 211-4, 211-5, and 211-6 and the size of the response signal of one second electrode 212-2 is greater than the size of the response signals of the other second electrodes 212-1, 212-3, 212-4, 212-5, and 212-6, the controller 240 may determine a position at which the first electrode 211-3 intersects with the second electrode 212-2 as the position of the stylus pen 100.

Additionally, based on the response signal, the controller 240 may determine a pressure (e.g., writing pressure) of the input object on the touch panel 200. As described above, a response signal may vary according to a writing pressure.

It is understood that in one or more other exemplary embodiments, the touch panel 200 may further include configurations other than the above-described configuration. For example, if the touch panel 200 is a touch screen, a display may further be included. If the touch panel 200 is a device, such as smart phones, portable multimedia players, etc., the touch panel 200 may further include a display, a storage unit (e.g., storage), a communication unit (e.g., communicator, transceiver, network adapter, radio frequency transmitter, etc.), and like.

While in the exemplary embodiment described above with reference to FIG. 27, the channel electrode portion 210 is composed of a plurality of electrodes, it is understood that one or more other exemplary embodiments are not limited thereto. For example, according to another exemplary embodiment, the channel electrode portion 210 may be implemented by a plurality of antenna loops. Also, according to another exemplary embodiment, the channel electrode portion 210 may be implemented in a form including a plurality of electrodes and a plurality of antenna loops.

Also, the exemplary embodiment described above with reference to FIG. 27, the drive unit 220, the receiving unit 230, and the controller 240 have been shown and described as being separate components. However, the function of each of the above components may be implemented to be performed by a single component (for example, a controller).

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described components (e.g., the controller 240) can include circuitry, a processor, a microprocessor, etc., and may execute a computer program stored in a computer-readable medium.

While exemplary embodiments have been described above, additional variations and modifications of exemplary embodiments may occur to those skilled in the art based on the present disclosure. Therefore, it is intended that the appended claims shall be construed to include both the above exemplary embodiments and all such variations and modifications that fall within the spirit and scope of the inventive concepts.

What is claimed is:

1. A stylus pen for indicating a position on a touch panel, the stylus pen comprising:
   a conductive tip configured to receive an electric field transmission signal from at least one electrode of the touch panel;
   a circuit portion configured to generate an electric field receiving signal corresponding to the received electric field transmission signal;

a variable capacitor, disposed between the conductive tip and the circuit portion, configured to vary the electric field receiving signal depending on a pressure applied to the conductive tip;

a conductive body, disposed outside the variable capacitor, for electrically connecting the conductive tip and the circuit portion;

an elastic member configured to restore a position of the conductive tip;

an insulator on an outer circumferential surface of the conductive tip, to electrically isolate the conductive tip from the elastic member and the variable capacitor; and a conductive support member comprising a first receiving hole in a first end of the conductive support member and a second receiving hole in a second end, opposite the first end, of the conductive support member, wherein the variable capacitor comprises:
　a dielectric comprising a first surface and a second surface positioned opposite to the first surface;
　a first electrode in contact with the first surface of the dielectric; and
　a conductive variable electrode configured such that a contact area between the conductive variable electrode and the second surface of the dielectric is varied depending on the pressure applied through the conductive tip, and wherein the conductive body extends beyond the dielectric in a direction towards the circuit portion of the stylus pen wherein the first receiving hole is coupled with the conductive variable electrode, and wherein the insulator is on an outer circumferential surface of the conductive support member to isolate the conductive support member from the elastic member.

2. The stylus pen of claim 1, wherein the conductive variable electrode is configured such that a central portion of a surface in contact with the second surface of the dielectric is convex from an edge portion of the surface.

3. The stylus pen of claim 1, wherein the conductive variable electrode is configured such that a central portion of a surface in contact with the second surface of the dielectric is concave from an edge portion of the surface.

4. The stylus pen of claim 1, wherein the conductive variable electrode comprises a conductive rubber.

5. The stylus pen of claim 1, further comprising another elastic member in an inside of the conductive variable electrode.

6. The stylus pen of claim 1, further comprising a ground portion electrically connected to a user through at least one of direct contact and capacitive coupling.

7. The stylus pen of claim 6, further comprising a conductive case isolated from the conductive body and connected to the ground portion.

8. The stylus pen of claim 1, further comprising:
　a housing having a tubular shape and housing the variable capacitor,
　wherein the housing is formed of a non-conductive material, and comprises at least one opening on an outer circumferential surface of the housing and through which the conductive body passes.

9. The stylus pen of claim 1, wherein:
　the insulator comprises a first cap and a second cap; and
　the first cap is on an end of the housing and supports a first end of the elastic member, and the second cap is on the outer circumferential surface of the conductive tip and supports a second end of the elastic member.

10. The stylus pen of claim 1, wherein the insulator comprises a guide member on the outer circumferential surface of the conductive tip and configured to guide the conductive tip in a lengthwise direction of the housing.

11. The stylus pen of claim 10, wherein the guide member supports a first end of the elastic member and a projection on an inner circumferential surface of the housing supports a second end of the elastic member.

12. The stylus pen of claim 1, wherein the elastic member comprises a non-conductive material.

13. The stylus pen of claim 1, wherein the circuit portion comprises:
　a capacitor having a predetermined capacitance; and
　a switch configured to allow the capacitor to be selectively connected in parallel to the variable capacitor.

14. The stylus pen of claim 1, wherein a first end of the variable capacitor is directly connected to an end of the circuit portion, and a second end of the variable capacitor is connected to the circuit portion through the conductive body.

15. A stylus pen for indicating a position on a touch panel, the stylus pen comprising:
　a conductive tip configured to receive an electric field transmission signal from at least one electrode of the touch panel;
　a circuit portion configured to generate an electric field receiving signal corresponding to the received electric field transmission signal;
　a variable capacitor, disposed between the conductive tip and the circuit portion, configured to vary the electric field receiving signal depending on a pressure applied to the conductive tip; and
　a conductive body, disposed outside the variable capacitor, for electrically connecting the conductive tip and the circuit portion, wherein:
　the conductive body comprises a plurality of plates and a circular member connected to an end of each of the plurality of plates;
　the plurality of plates are spaced apart from each other and disposed side-by-side; and
　the circular member comprises an opening through which the conductive tip passes.

16. A stylus pen comprises:
　a conductive tip projecting from an end of the stylus pen;
　a dielectric comprising a first surface and a second surface positioned opposite to the first surface;
　a first electrode in contact with the first surface of the dielectric;
　a conductive variable electrode configured such that a contact area between the conductive variable electrode and the second surface of the dielectric is varied depending on a pressure applied through the conductive tip;
　a conductive body, disposed outside the dielectric, for electrically connecting the conductive tip and the conductive variable electrode, and isolated from the dielectric and the first electrode;
　an elastic member isolated from the conductive tip and configured to restore a position of the conductive tip;
　an insulator on an outer circumferential surface of the conductive tip, to electrically isolate the conductive tip from the elastic member and the conductive variable electrode; and
　a conductive support member comprising a first receiving hole in a first end of the conductive support member and a second receiving hole in a second end, opposite the first end, of the conductive support member, wherein the conductive body electrically connects the conductive variable electrode and a circuit portion of the stylus pen,
wherein the conductive body extends beyond the dielectric in a direction towards the circuit portion of the stylus pen,
wherein the first receiving hole is coupled with the conductive variable electrode, and
wherein the insulator is on an outer circumferential surface of the conductive support member to isolate the conductive support member from the elastic member.

* * * * *